United States Patent
Moonen et al.

(10) Patent No.: US 9,868,104 B2
(45) Date of Patent: *Jan. 16, 2018

(54) PRESSURE CONTROLLER

(71) Applicant: Avantium Technologies B.V., Amsterdam (NL)

(72) Inventors: Roelandus Hendrikus Wilhelmus Moonen, Amsterdam (NL); René Emilio Bodenstaff, Amsterdam (NL); Benno Hartog, Amsterdam (NL)

(73) Assignee: Avantium Technologies B.V., Amsterdam (NL)

(*) Notice: Subject to any disclaimer, the term of this patent is extended or adjusted under 35 U.S.C. 154(b) by 179 days.

This patent is subject to a terminal disclaimer.

(21) Appl. No.: 14/435,298

(22) PCT Filed: Oct. 11, 2013

(86) PCT No.: PCT/NL2013/050724
§ 371 (c)(1),
(2) Date: Apr. 13, 2015

(87) PCT Pub. No.: WO2014/062056
PCT Pub. Date: Apr. 24, 2014

(65) Prior Publication Data
US 2015/0273427 A1    Oct. 1, 2015

Related U.S. Application Data

(60) Provisional application No. 61/715,540, filed on Oct. 18, 2012.

(30) Foreign Application Priority Data

Oct. 18, 2012    (NL) .................................... 2009660

(51) Int. Cl.
*B01J 19/00* (2006.01)
*B01L 3/00* (2006.01)
(Continued)

(52) U.S. Cl.
CPC ....... *B01J 19/0006* (2013.01); *B01J 19/0013* (2013.01); *B01J 19/0046* (2013.01);
(Continued)

(58) Field of Classification Search
CPC ................ B01J 19/0006; B01J 19/0013; B01J 19/0046; B01J 2219/00065;
(Continued)

(56) References Cited

U.S. PATENT DOCUMENTS 6,306,658 B1 * 10/2001 Turner .............. B01F 15/00207
374/E13.001
7,141,218 B2 * 11/2006 Van Erden .................. B01J 3/04
422/130
(Continued)

FOREIGN PATENT DOCUMENTS

| EP | 1888224 | 10/2006 |
| WO | 2006/107187 A1 | 10/2006 |
| WO | 2009/066237 A2 | 5/2009 |

OTHER PUBLICATIONS

Perez-Ramirez et al. Catalysis Today, vol. 60, 2000, pp. 93-109.*

*Primary Examiner* — Maureen Wallenhorst
(74) *Attorney, Agent, or Firm* — Hoffman & Baron, LLP

(57) ABSTRACT

A pressure controller for use in operating parallel reactors, the pressure controller including a reference pressure controller, the reference pressure controller including: a first restrictor channel, a second restrictor channel, a fluid passage, which fluid passage extends between the outlet of the first restrictor channel and the inlet of the second restrictor channel, a pressure control fluid source being adapted to (Continued)

provide a flow of pressure control fluid, having an entrance pressure at the inlet of the first restrictor channel and an exit pressure at the outlet of the second restrictor channel, the flow of pressure control fluid experiencing a first pressure drop $\Delta p1$ over the first restrictor channel and a second pressure drop $\Delta p2$ over the second restrictor channel, a connector connecting the fluid passage to the control chamber, the pressure control fluid at the connector having an intermediate pressure, the intermediate pressure being determined by the ratio between the first pressure drop $\Delta p1$ and the second pressure drop $\Delta p2$, a controllable thermal device, the thermal device being adapted to heat and/or cool the first restrictor channel and/or the second restrictor channel, therewith influencing the ratio between the first pressure drop $\Delta p1$ and the second pressure drop $\Delta p2$.

23 Claims, 13 Drawing Sheets

(51) Int. Cl.
  *F16K 99/00* (2006.01)
  *G05D 16/18* (2006.01)
  *G05D 16/20* (2006.01)

(52) U.S. Cl.
  CPC .... *B01L 3/502746* (2013.01); *F16K 99/0011* (2013.01); *F16K 99/0015* (2013.01); *F16K 99/0026* (2013.01); *F16K 99/0044* (2013.01); *F16K 99/0061* (2013.01); *G05D 16/185* (2013.01); *G05D 16/2026* (2013.01); *G05D 16/2093* (2013.01); *B01J 2219/00065* (2013.01); *B01J 2219/00162* (2013.01); *B01J 2219/00477* (2013.01); *B01J 2219/00495* (2013.01); *B01L 2300/14* (2013.01); *B01L 2400/0481* (2013.01); *B01L 2400/0655* (2013.01); *Y10T 137/6416* (2015.04); *Y10T 436/12* (2015.01)

(58) Field of Classification Search
  CPC .... B01J 2219/00162; B01J 2219/00477; B01J 2219/00495; B01L 2300/14; B01L 2400/0481; B01L 2400/0655; B01L 3/502746; F16K 99/0011; F16K 99/0015; F16K 99/0026; F16K 99/0044; F16K 99/0061; G05D 16/185; G05D 16/2026; G05D 16/2093; Y10T 137/6416; Y10T 436/11; Y10T 436/115831; Y10T 436/12; Y10T 436/2575; G01N 35/00584
  USPC ........ 436/43, 50, 55, 147, 148, 180; 422/67, 422/68.1, 82.12, 82.13, 502, 505, 109, 422/607; 137/334
  See application file for complete search history.

(56) References Cited

U.S. PATENT DOCUMENTS

| | | | |
|---|---|---|---|
| 2011/0108132 A1* | 5/2011 | Moonen | G05D 7/0635 137/98 |
| 2016/0121291 A1* | 5/2016 | Moonen | B01J 19/0046 423/659 |

* cited by examiner

PRESSURE CONTROLLER

CROSS-REFERENCE TO RELATED APPLICATIONS

This application is the National Stage of International Application No. PCT/NL2013/050724 filed Oct. 11, 2013, which claims the benefit of Netherlands Application No. NL 2009660, filed Oct. 18, 2012, and the benefit of U.S. Provisional Application No. 61/715,540, filed Oct. 18, 2012, the contents of all of which are incorporated by reference herein.

FIELD OF THE INVENTION

The invention pertains to pressure control in systems for operating parallel reactors.

BACKGROUND OF THE INVENTION

Parallel reactors are widely used in research into chemical reactions, in particular for high throughput experimentation. In high throughput experimentation, a plurality of relatively small scale reactors is placed in parallel. In each reactor, a different experiment takes place. Usually, conditions and/or reactants are varied slightly over the different reactors. For example all reactors are operated at the same pressure and temperature, but all contain a different reactant. After the experiments are carried out, the results of the experiments are compared with each other, and for example interesting reactants (e.g. catalysts) are identified. Carrying the experiments out in parallel leads to a significant reduction in the time it takes to come up with experimentation results.

Usually, in high throughput experimentation, the reactors are small, as are the amounts of reactants that are used. Often, flow through reactors are used, and the flow rates of the fluid flows are also low. Typical reactor sizes do not exceed 1 cm in diameter, and when for example catalytic activity is tested, typically a few grams of a potential catalyst are present in each reactor. Sometimes even less potential catalyst is used, e.g. between 0.005 and 1 gram. Flow rates are usually less than 10 ml/hour for liquids and/or less than 150 Nml/minute for gas. The typical low flow rate used in high throughput reactions makes controlling the fluid flow through the individual reactors hard.

In order to be able to compare the results of the experiments that are carried out in the different reactors with each other, it is important to accurately control the process conditions of each experiment. Such process conditions include e.g. temperature, pressure and flow rate.

A different use of parallel reactors in chemistry is production of chemical compounds using microreactors. Microreactors are of similar size or slightly larger than the reactors used in high throughput experimentation. When it has been proven that a certain compound can be produced at a small scale, using a small scale reactor, a plurality of such small scale reactors is arranged in parallel. The compound is then produced in these reactors, using the same reaction conditions as in the original, single reactor.

So, also in this application of parallel reactors, it is important that the same reaction conditions are present in all reactors.

EP1888224 describes a system for high throughput experiments. In this known system, multiple parallel flow-through reactors are present. In each flow-through reactor a fixed bed is present that contains a potential catalyst. All reactors receive a reaction fluid from a fluid source. The fluid flow from the fluid source is split up into multiple fluid flows, each going to a reactor. In the reactors, a reaction may take place. The reactor effluent is then analyzed, for example in order to determine whether the potential catalyst is a good candidate for further investigation.

In the system of EP1888224, the pressure in the reactors is controlled by a back pressure regulator. This back pressure regulator comprises a plurality of flow channels. Each flow channel receives the flow of reactor effluent from its own dedicated reactor. The flow channels extend through a common pressure control chamber, in which a control gas at a reference pressure is present. The flow channels have flexible walls, so that the pressure in the common control chamber can influence the cross sectional area of the flow channels, and therewith control the pressure in the reactors upstream of the flow channels. The reference pressure in the pressure control chamber is controlled by a single pressure controller. In the system of EP1888224, the pressure is controlled in such a way that the backpressure of all reactors is the same. This is however not always desired. The backpressure regulator of EP1888224 can be modified in such a way that the common pressure control chamber is divided up into several compartments in which the reference pressure can be controlled individually. So, different compartments can have different reference pressures. Alternatively, individual dome regulators could be used downstream of each reactor.

However, such a setup would require a plurality of pressure controllers, each pressure controller being dedicated to one compartment of the pressure control chamber. This is disadvantageous, as pressure controllers are generally bulky and expensive equipment.

SUMMARY OF THE INVENTION

The invention aims to provide a pressure controller that is suitable for use in operating parallel reactors.

In the pressure controller according to the invention, a flow channel is present through which the fluid flows of which the pressure is to be controlled. This fluid can be reactor effluent, but alternatively, it can be a reaction fluid, a dilution fluid or a purge fluid. The flow channel may receive the fluid flow for example from a fluid source, a reactor feed channel, a reactor outlet, a reactor effluent line.

The pressure controller further comprises a movable valve member. This moveable valve member controls the size of the cross sectional area of the flow channel. Moving the valve member reduces or enlarges the cross sectional area of the flow channel, therewith increasing or decreasing the pressure.

The valve member can take many alternative embodiments. For example, the valve member can be a flexible membrane that forms part of the wall of the flow channel. Alternatively, for example, the valve member can be a slide, e.g. a needle or an other type of solid body, that extends into the flow channel and can take a position that it at least partly blocks the flow channel.

Optionally, the valve member is moveable in such a way that the size of the cross sectional area is continuously variable, at least over a range. The pressure controller according to the invention preferably is a pressure controller that allows for continuous or step-wise adjusting the pressure over a pressure range. The moveable valve member can assume more positions than just fully opening the flow channel and fully closing the flow channel. Positions between fully opening the flow channel and fully closing the flow channel can be assumed as well by the valve member.

The pressure controller according to the invention further comprises a valve actuator. The valve actuator is adapted to control the position of the movable valve member. The valve actuator in the pressure controller according to the invention is of the type that uses a fluid pressure for a reference pressure. To that end, the valve actuator comprises a control chamber having a fluid under a reference pressure therein. That fluid engages a pressure surface of the valve member for exerting a control force on that valve member. The pressure of the fluid is used to control, if necessary: change, the position of the moveable valve member in order to control, if necessary: change, the cross sectional area of the flow channel.

The reference pressure in the control chamber is controlled by a reference pressure controller. According to the invention, this reference pressure controller comprises a first restrictor channel and a second restrictor channel. These restrictors are arranged in series, with a fluid passage between them, extending from the outlet of the first restrictor channel to the inlet of the second restrictor channel. A connector connects the fluid passage to the control chamber of the valve actuator.

The reference pressure controller further comprises a pressure control fluid source. This pressure control fluid source is in fluid communication with the inlet of the first restrictor channel. The pressure control fluid source is adapted to provide a flow of pressure control fluid through the first restrictor channel, the fluid passage and the second restrictor channel. The flow of pressure control fluid has an entrance pressure at the inlet of the first restrictor channel and an exit pressure at the outlet of the second restrictor passage. As there is a flow of pressure control fluid from the inlet of the first restrictor channel to the outlet of the second restrictor channel, the entrance pressure is higher than the exit pressure. The pressure control fluid can be a gas or a liquid.

The flow of pressure control fluid experiences a first pressure drop $\Delta\rho1$ over the first restrictor channel and a second pressure drop $\Delta\rho2$ over the second restrictor channel. At the connector, the pressure control fluid will have an intermediate pressure that is lower than the entrance pressure at the inlet of the first restrictor channel but higher than the exit pressure at the outlet of the second restrictor channel. The intermediate pressure is determined by the ratio between the first pressure drop $\Delta\rho1$ and the second pressure drop $\Delta\rho2$.

The first pressure drop $\Delta\rho1$ and the second pressure drop $\Delta\rho2$ are directly linked to the resistance to fluid flow of the first restrictor channel and the second restrictor channel, respectively. The resistance to fluid flow of these restrictor channels can be influenced by changing their temperature. The change in temperature of a restrictor channel changes the temperature of the fluid flowing through that restrictor channel. This affects fluid parameters like viscosity, volume and flow rate, which in turn affect the resistance to fluid flow and thus the pressure drop.

Looking at a single restrictor channel, if a gas flows through restrictor channel and the temperature of the gas is increased (e.g. by heating the restrictor), the pressure drop over that restrictor channel increases as well. If the temperature in this case is lowered, e.g. by cooling the restrictor, the pressure drop over the restrictor channel decreases.

In case of a single restrictor channel with liquid flowing through it instead of a gas, the effects of heating and cooling are opposite: heating the liquid will decrease the pressure drop while cooling the liquid will increase the pressure drop.

So, in both cases the pressure drop over a restrictor channel can be influenced by changing the temperature of the fluid that flows through the restrictor channel. The easiest way to influence the temperature of that fluid is by heating or cooling the restrictor channel.

As the intermediate pressure that occurs at the connector depends on the ratio between the first pressure drop $\Delta\rho1$ that occurs at the first restrictor channel and the second pressure drop $\Delta\rho2$ that occurs at the second restrictor channel, the intermediate pressure can be regulated by changing the temperature of the first and/or the second restrictor channel. As the intermediate pressure occurs at the connector that connects the reference pressure controller to the control chamber, the pressure in the control chamber corresponds to the intermediate pressure. So, the pressure in the control chamber can be regulated by regulating the intermediate pressure.

In order to achieve such pressure regulation, the reference pressure controller of the pressure controller according to the invention has been provided with a controllable thermal device. This thermal device is adapted to heat and/or cool the first restrictor channel and/or the second restrictor channel, therewith influencing the ratio between the first pressure drop $\Delta\rho1$ and the second pressure drop $\Delta\rho2$. The thermal device comprises a thermal controller for controlling the thermal output of the thermal device.

The ratio between the first pressure drop $\Delta\rho1$ and the second pressure drop $\Delta\rho2$ can be changed by changing the temperature of the first restrictor channel and not changing the temperature of the second restrictor channel, by changing the temperature of the second restrictor channel and not changing the temperature of the first restrictor channel or by changing the temperature of both the first and the second restrictor channel. In the latter case, it is possible to heat one restrictor channel and to cool the other restrictor channel. This helps to obtain rapid change of the ratio of the pressure drops and therewith of the intermediate pressure. It is however possible as an alternative to heat or cool both restrictor channels, but heating or cooling them both to a different extent.

The flow rate of the pressure control fluid through the restrictor channels and in particular the flow rate through the connector is relevant for the response time of the pressure controller according to the invention. To change the pressure in the control chamber, pressure control fluid has to flow into or out of the pressure control chamber. How much pressure control fluid has to flow into or out of the control chamber to change the pressure in the control chamber depends on the design of the moveable valve member and the valve actuator, but in general a low flow rate through the restrictor channels and in particular through the connector will increase the response time of the pressure controller.

Typical flow rates in the restrictor channels and/or the connector are 0.1 to 200 Nml per minute when a gas, for example nitrogen gas ($N_2$), is used as a pressure control fluid. In case the pressure control fluid is a liquid, typical flow rates are 0.1 to 500 microliter per minute.

Typically, the volume of the pressure control fluid in the first restrictor channel, the second restrictor channel, the fluid passage, the connector and the control chamber together is less than 10 ml, preferably less than 5 ml, typically less than 1 ml. Preferably, the inner diameter of the first restrictor channel, the second restrictor channel, the fluid passage and/or the connector is 2.0 mm or less, optionally 1.5 mm or less, or even 1.0 mm or less. Typically, the inner diameter of the first restrictor channel, the second restrictor channel, the fluid passage and/or the connector may even be 0.7 mm or less.

The pressure controller according to the invention is suitable for use in applications at high pressures, for example, around 50 bar, around 100 bar, around 200 bar or around 300 bar. As the volume of the pressure control fluid in the reference pressure controller is generally small, the risks involved with high pressures are limited.

In a possible embodiment, the first restrictor channel and/or the second restrictor channel is a channel in a microfluidic chip. In a possible embodiment the first restrictor channel is a channel in a first microfluidic chip and the second restrictor channel is a channel in a second microfluidic chip. In an alternative embodiment, the first restrictor channel is a channel in a first microfluidic chip and the second restrictor channel is a channel in the same microfluidic chip. In that embodiment, preferably, the fluid passage between the first and the second restrictor channel is also a channel in that microfluidic chip.

Microfluidic chips are rather cheap and easy to obtain. They are also easy to handle, for example when they need to be exchanged in case the set up of the pressure controller has to be changed. Also, microfluidic chips with thermal components, e.g. heat tracing, are available. Such microfluidic chips can be used in the pressure controller according to the invention, for example by using the thermal components on the microfluidic chip as part of the thermal device of the reference pressure controller.

Alternatively, the first restrictor channel and/or the second restrictor channel is a channel in a capillary tube.

In a possible embodiment, the pressure control fluid source comprises a pressure control fluid reservoir that is arranged upstream of and in fluid communication with the inlet of the first restrictor channel. The pressure control fluid reservoir is adapted to contain a pressurized control fluid, preferably at a pressure that is higher than the entrance pressure. This is a simple way of providing a flow of pressure control fluid through the first restrictor channel, the fluid passage and the second restrictor channel.

In this embodiment, after leaving the outlet of the second restrictor channel the pressure control fluid can be transferred to waste or it can be transferred back to the pressure control fluid reservoir, for example by a return line and a pump.

In an alternative embodiment, a return line is present that extends from the outlet of the second restrictor channel to the inlet of the first restrictor channel. Further, a pump is present to provide circulation of the pressure control fluid through the first restrictor, the fluid passage, the second restrictor and the return line.

There are many ways in which the heating and/or cooling of the first and/or second restrictor channel can be carried out. So, there are many embodiments possible for the thermal device of the reference pressure controller.

In a possible embodiment, the thermal device comprises a Peltier element. The thermal output of the Peltier element can be used to heat and/or cool a single restrictor channel.

A Peltier element in use has a warm side and a cold side. In a possible embodiment, the warm side of the Peltier element can be used to heat one restrictor channel and the cold side of the same Peltier element can be used to cool the other restrictor channel.

In a possible embodiment, the thermal device comprises electric heat tracing. This can for example comprise an electrical wire having an electrical resistance that is wound around a capillary that contains the first or second restrictor channel. Alternatively, it can be a metal wire or other metal element that is deposited on a microfluidic chip, which microfluidic chip contains the first and/or second restrictor channel.

In a possible embodiment, the thermal device comprises a pair of electrodes with a voltage thereon.

In a possible embodiment, the thermal device comprises a system for circulating a thermal fluid for heating and/or cooling a restrictor channel.

In a possible embodiment, the thermal device comprises a housing, in which housing the first or second restrictor channel is accommodated. The housing has an interior and the temperature of the interior of the housing can be controlled. Therewith, also the temperature of the restrictor channel in the housing can be controlled.

The pressure controller according to the invention can be used in combination with a system for operating parallel reactors. Such a system can for example be used for performing high throughput experiments, for example for catalyst screening. Alternatively, such a system can be used for using a plurality of parallel microreactors for the synthesis of chemical compounds.

Such a system comprises a plurality of reactor assemblies. Each reactor assembly comprises a flow-through reactor having an inlet and an outlet. Reaction fluid enters the reactor via the reactor inlet and the reaction products leave the reactor as reactor effluent via the reactor outlet. Generally, the flow of reaction fluid into the reactor and the flow of reactor effluent from the reactor is continuously. This is contrary to a batch reactor, in which the reaction products generally mainly remain in the reactor until the reaction is finished.

The reactor optionally comprises a fixed bed, that for example supports a catalyst or potential catalyst.

Each reactor assembly further comprises a reactor feed line. The reactor feed line takes reaction fluid to the reactor. To that end, the reactor feed line has a first end that is in fluid communication with a primary fluid source and a second end that is connected to and in fluid communication with the reactor inlet.

The system can have a single primary fluid source that supplies reaction fluid to all reactors. In that case, a flow splitter is present between the primary fluid source and the first ends of the reactor feed lines in order to split the fluid flow over the reactor assemblies. Preferably, the flow rate of the fluid flow is the same for each reactor assembly.

Alternatively, the system can have multiple primary fluid sources. For example, each reactor assembly can have its own primary fluid source. In that case, a flow splitter is not necessary. In this embodiment, the number of fluid sources is the same as the number of reactor assemblies.

Alternatively, the system can have multiple fluid sources, but less than the number of reactor assemblies. In this embodiment, a group of reactor assemblies (the group containing not all reactor assemblies of the system) shares a common primary fluid source. A flow splitter is present between the primary fluid source and the first ends of the reactor feed lines of the groups of reactor assemblies in order to split the fluid flow over the reactor assemblies of the group. Preferably, the flow rate of the fluid flow is the same for each reactor assembly of the group.

Combinations of the latter two embodiments are possible.

Each reactor assembly may each have multiple feed lines. For example, each reactor may have two or three reactor inlets, a dedicated reactor feed line being connected to each reactor inlet. In such an embodiment, one reactor feed line may be used to feed a gaseous reaction fluid to the reactor and an other reactor feed line may be used to feed a liquid reaction fluid to that reactor. A third reactor feed line may be used to feed a purge fluid or diluent to the reactor inlet.

In a possible embodiment, each reactor assembly further comprises a dilution line, said dilution line being connected to the reactor effluent line, preferably adjacent to the reactor outlet. Or, said dilution line is connected to the reactor itself, adjacent to the reactor outlet, or, if a fixed bed is present in the reactor, between the fixed bed and the reactor outlet.

In a possible embodiment, a plurality of pressure controllers according to the invention is present. Optionally, the first restrictor channels of these pressure controllers are present in a single, first microfluidic chip and the second restrictor channels of these pressure controllers are present in an other single, second microfluidic chip. This makes it easy to swiftly exchange all first and/or all second flow restrictor channels. The first and/or second microfluidic chips is/are provided with heaters/and or coolers that form part of the thermal device of the pressure controller. The heaters and/or coolers are adapted to individually heat and/or cool a single restrictor channel.

If multiple pressure controllers according to the invention are present in the system, they can all be provided with their own pressure control fluid source. Alternatively, a common pressure control fluid source is present, and a flow splitter that distributes pressure control fluid from the single pressure control fluid source to the reference pressure controllers of multiple pressure controllers according to the invention.

Furthermore, a pressure control fluid collection device can be present, that receives used pressure control fluid from a plurality of reference pressure controllers.

In any of these systems, a pressure controller according to the invention is arranged to control the pressure in a reactor of a reactor assembly or in the system upstream or downstream of said reactor of said reactor assembly.

Preferably, each reactor assembly is provided with its own, dedicated pressure controller according to the invention.

The pressure controller can be connected directly to the reactor. Alternatively, the pressure controller can be connected to or arranged in a reactor feed line or a reactor effluent line. Optionally, the pressure controller according to the invention is connected to or arranged in a reactor feed line adjacent to the reactor inlet or connected to or arranged in a reactor effluent line adjacent to the reactor outlet. This arrangement has shown to provide an accurate control of the reactor pressure and/or to help to establish an even distribution of fluid flow over the plurality of reactor assemblies.

Optionally, the system further comprises a pressure sensor. Such a pressure sensor is adapted to measure the pressure in a reactor of a reactor assembly or upstream or downstream of a reactor in a reactor assembly. The pressure sensor is adapted to provide a pressure measurement signal which can be used as an input signal for the pressure controller according to the invention. In particular, the pressure measurement signal can be used to control the reference pressure. To that end, the thermal device is adapted to heat and/or cool the first restrictor channel and/or the second restrictor channel of the reference pressure controller on the basis of said pressure measurement signal.

In a possible embodiment, the pressure sensor is arranged to measure the pressure in the reactor feed line, for example adjacent to the reactor inlet, and the pressure controller is arranged to control the pressure in the reactor effluent line, for example close to the reactor outlet.

This embodiment is particularly advantageous in case a flow splitter is present upstream of the reactor feed lines, and a pressure controller according to the invention is connected to all reactor assemblies such that each reactor assembly has its own dedicated pressure controller. By controlling the pressure in the reactor feed lines in such a way that the pressure in all reactor feed lines is the same, the flow is distributed evenly over the reactors with a high level of accuracy, even if the pressure drop over the flow splitter is not very high compared to for example the pressure drop over the reactor vessels.

In an example of such an embodiment, the system comprises a flow splitter, which is arranged downstream of the primary fluid source and upstream of the reactor assemblies. The flow splitter has an inlet and multiple passive flow restrictors. The inlet of the flow splitter is connected to the primary fluid source and each passive flow restrictor is in fluid communication with said inlet. Each passive flow restrictor has an outlet, which outlet is connected to the first end of the reactor feed line of its own dedicated reactor assembly. All passive flow restrictors have an at least substantially equal resistance to fluid flow.

In this embodiment, each reactor assembly is provided with a pressure controller according to the invention. The pressure controller is arranged to control the pressure in the reactor effluent line, optionally at or adjacent to the reactor outlet of said reactor of said reactor assembly. Each reactor feed line is provided with a pressure sensor, which pressure sensor is arranged to measure the pressure in said reactor feed line, optionally at or adjacent to the reactor inlet of a reactor in a reactor assembly.

In this embodiment, further a pressure control arrangement is provided. This pressure control arrangement is linked to the pressure sensors and the pressure controllers. The pressure control arrangement comprises an input device allowing to input at least a feed line pressure setpoint into the pressure control arrangement. The feed line pressure setpoint represents a desired feed line pressure. Advantageously, the desired feed line pressure is the same for all reactor assemblies.

In this embodiment, the pressure control arrangement is adapted and/or programmed to individually control the pressure controllers such that for each reactor assembly the pressure measured by the corresponding pressure sensor is compared to said feed line pressure setpoint. In case of a difference between the measured feed line pressure and the feed line pressure setpoint, the corresponding pressure controller is adjusted such that the feed line pressures are the same during an experiment.

The pressure controller according to the invention can alternatively be used in different systems than the system and embodiments thereof as described above. For example, the pressure controller according to the invention can be used in a system that comprises just one reactor assembly instead of a plurality of reactor assemblies as in the system described above.

An other example of an alternative system in which the pressure controller according to the invention can be used is a system that comprises one or more batch reactors that have to operate at a controlled pressure. This controlled pressure can be a fixed pressure or vary over time. Sometimes, the pressure in a batch reactor may vary due to the reaction taking place (e.g. if a gas or liquid is formed or consumed during the reactor and/or the temperature in the reactor changes due to the reaction). If it is desired that the pressure remains constant or follows a certain profile over time, the batch reactor can be provided a pressure control line for controlled discharge of reactor effluent or blanket gas, just to keep the pressure under control. Such a pressure control line may be provided with a pressure controller according to the invention.

The invention further pertains to a method for operating parallel reactors. This method starts with providing a system for operating parallel reactors according to the invention. Then, a fluid flow from the primary fluid source through the reactor feed lines, the reactors and the reactor effluent lines, is provided. Furthermore, a pressure control fluid is made to flow through the first restrictor channel, the fluid passage and the second restrictor channel of the reference pressure controller of said pressure controller, and therewith making a first pressure drop $\Delta p1$ occur over the first restrictor channel and a second pressure drop $\Delta p2$ occur over the second restrictor channel.

The pressure in a reactor feed line or a reactor effluent line of a reactor assembly is measured, such that a pressure measurement value is obtained. This obtained measurement value is compared with a set value for the desired pressure.

In case the measured pressure deviates from the desired pressure, the reference pressure in the control chamber of the pressure controller is changed by activating the thermal device of the pressure controller, therewith changing the temperature of the pressure control fluid in the first restrictor channel and/or the second restrictor channel such that the pressure drop ratio $\Delta p1:\Delta p2$ changes.

In a possible embodiment, the pressure is measured at or adjacent to the reactor inlet of a reactor in a reactor assembly, and the pressure controller is arranged in said reactor assembly at or adjacent to the reactor outlet of said reactor of said reactor assembly.

BRIEF DESCRIPTION OF THE DRAWINGS

The invention will be described in more detail below under reference to the drawing, in which in a non-limiting manner exemplary embodiments of the invention will be shown.

The drawing shows in.

DETAILED DESCRIPTION OF THE INVENTION

Figure 1:
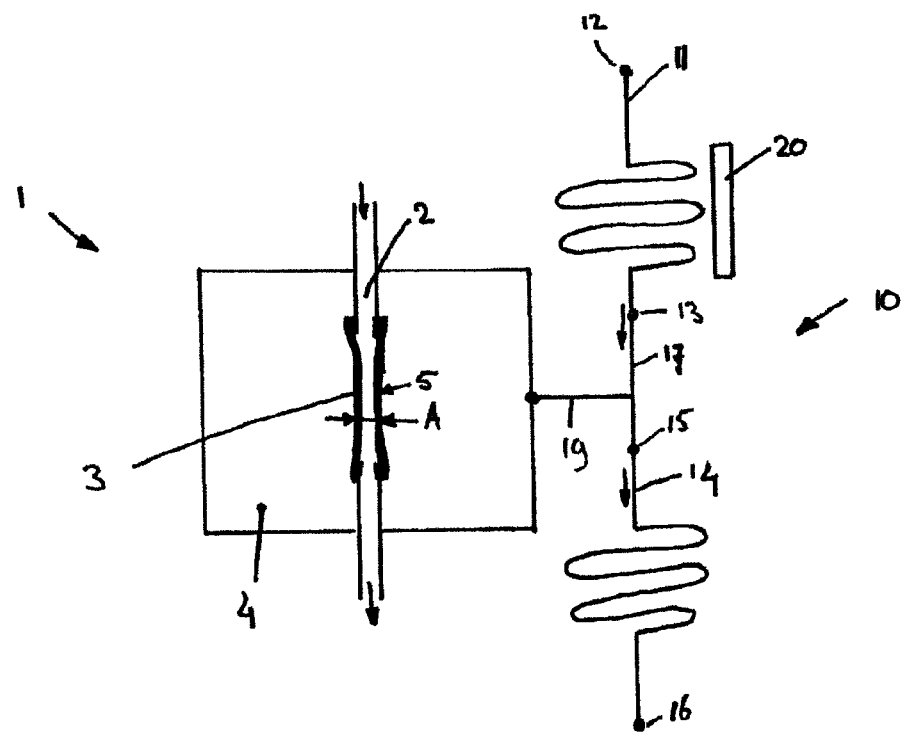
FIG. 1: a first embodiment of a pressure controller according to the invention.

FIG. 1 shows a first embodiment of a pressure controller 1 according to the invention.

The pressure controller of FIG. 1 comprises a flow channel 2. The fluid flow of which the pressure is to be controlled passes through this flow channel 2 as indicated by the arrows in FIG. 1. The flow channel 2 has a cross sectional area indicated by arrows A in FIG. 1. Flow channel 2 can be connected to or arranged for example a reactor feed line or a reactor effluent line of a reactor system.

The pressure controller of FIG. 1 further comprises a movable valve member 3. The moveable valve member 3 is adapted to control the size of the cross sectional area of the flow channel 2. This has the effect that the pressure of the fluid flow in the flow channel 2 is controlled. In the embodiment of FIG. 1, the moveable member 3 is a membrane that forms part of the wall of the flow channel 2. In this case, the membrane is in the form of a tube.

The pressure controller of FIG. 1 further comprises a valve actuator. The valve actuator is adapted to control the position of the valve member 3. The valve actuator comprises a control chamber 4. In this control chamber 4, a fluid under a reference pressure is present. This fluid engages a pressure surface 5 of the valve member 3 for exerting a control force thereon in order to influence the cross sectional area of the flow channel 2. In the embodiment of FIG. 1, the pressure surface 5 is the outside of the wall of the tube-shaped membrane. The fluid in the control chamber 4 can for example squeeze the tube-shaped membrane to reduce the cross sectional area of the flow channel 2, so the pressure in the flow channel 2 increases.

The pressure controller of FIG. 1 further comprises a reference pressure controller 10. This reference pressure controller is adapted to control the reference pressure in the control chamber 4.

The reference pressure controller 10 comprises a first restrictor channel 11. The first restrictor channel 11 has an inlet 12 and an outlet 13. The reference pressure controller 10 further comprises a second restrictor channel 14. The second restrictor channel 14 has an inlet 15 and an outlet 16.

Furthermore, a fluid passage 17 is provided. This fluid passage 17 extends between the outlet 13 of the first restrictor channel 11 and the inlet 15 of the second restrictor channel 14. The fluid passage 17 allows fluid communication between the first restrictor channel 11 and the second restrictor channel 14. Depending on the specific embodiment, the fluid passage 17 can be very short (for example if only little space is available) or rather long (for example to allow the pressure fluid to change temperature back to the initial temperature after being heated or cooled in the first restrictor channel).

A pressure control fluid source (not shown in FIG. 1) is provided for providing a flow of a pressure control fluid through the first restrictor channel 11, the fluid passage 17 and the second restrictor channel 14, as indicated by the arrows in FIG. 1. The pressure control fluid can be a gas or a liquid. For example, nitrogen gas is a suitable pressure control fluid.

The flow of pressure control fluid has an entrance pressure at the inlet 12 of the first restrictor channel 11 and an exit pressure at the outlet 16 of the second restrictor channel 14. As there is a flow of pressure control fluid from the inlet 12 of the first restrictor channel 11 to the outlet 16 of the second restrictor channel 14, the entrance pressure is higher than the exit pressure.

The flow of pressure control fluid experiences a first pressure drop $\Delta p1$ over the first restrictor channel 11 and a second pressure drop $\Delta p2$ over the second restrictor channel 14.

The reference pressure controller 10 further comprises a connector 19 that connects the fluid passage 17 to the control chamber 4 of the valve actuator. The connector 19 is in fluid communication with the control chamber 4. The connector 19 can for example comprise a channel and/or a connection element such as a snap-fit connection element or a threaded connection element. The connector 19 could be welded or soldered to control chamber 4. The connector 19 can be permanently fixed to the control chamber 4 or it can be mounted in a detachable way.

The pressure control fluid has an intermediate pressure at the connector 19 which is lower than the entrance pressure but higher than the exit pressure. The value of the intermediate pressure is determined by the ratio between the first pressure drop $\Delta p1$ and the second pressure drop $\Delta p2$. For example, the resistance to fluid flow of the first restrictor channel 11 is the same as the resistance to fluid flow of the second restrictor channel 14, the entrance pressure at the inlet 12 of the first restrictor channel 11 is 150 bar and the exit pressure at the outlet 16 of the second restrictor channel 15 is 100 bar, the intermediate pressure will be 125 bar.

The intermediate pressure corresponds to the pressure in the control chamber 4.

The reference pressure controller 10 further comprises a controllable thermal device 20. Thermal device 20 is shown only schematically in FIG. 1. The thermal device 20 can be realized in many different ways: comprising a Peltier element, comprising electric heat tracing, comprising a pair of electrodes with a voltage thereon, comprising a system for circulating a thermal fluid for heating and/or cooling, comprising a housing for accommodating the first or second restrictor channel, the temperature of the interior of the housing being controllable.

The thermal device 20 is adapted to heat and/or cool the first restrictor channel 11 and/or the second restrictor channel 14. In the embodiment of FIG. 1, the thermal device is arranged and adapted to just heat and/or cool the first restrictor channel 11. Alternatively, the thermal device may be arranged and adapted to heat and/or cool just the second restrictor channel 14. Alternatively, the thermal device 20 may be arranged and adapted to heat and/or cool both the first restrictor channel 11 and the second restrictor channel 14.

Changing the temperature of a restrictor channel 11, 14 makes that the temperature of the pressure control fluid in that restrictor 11,14 also changes. This results in a change in pressure drop over the restrictor channel 11,14 of which the temperature has been changed.

Therewith, the thermal device 20 can be used to influence the ratio between the first pressure drop $\Delta p1$ and the second pressure drop $\Delta p2$, and therewith to change the intermediate pressure and the pressure in the pressure control chamber 4.

For example, initially the resistance to fluid flow of the first restrictor channel 11 is the same as the resistance to fluid flow of the second restrictor channel 14, the entrance pressure at the inlet 12 of the first restrictor channel 11 is 150 bar and the exit pressure at the outlet 16 of the second restrictor channel 15 is 100 bar, the intermediate pressure will be 125 bar.

For example, nitrogen gas is used as a pressure control fluid. And for example, the thermal device 20 is used to heat the first restrictor channel 11. No heating or cooling is applied to the second flow restrictor channel 14. Due to the heating of the first restrictor channel 11, the first pressure drop $\Delta p1$ that occurs over the first restrictor channel 11 increases, while the second pressure drop $\Delta p2$ over the second restrictor channel 14 does not change or at least does not change substantially. In general, the volume of fluid passing through the restrictor channels is so small that the pressure control fluid has cooled again when it passes through the second restrictor channel 14, so the resistance to fluid flow of the second restrictor channel 14 remains the same. If not the first restrictor channel 11 but (only) the second restrictor channel 14 is heated and/or cooled is by the thermal device 20, only the second pressure drop $\Delta p2$ will change, and not the first pressure drop $\Delta p1$ over the first restrictor channel 11.

The increase in the first pressure drop $\Delta p1$ while the second pressure drop remains at least substantially the same results in a decrease of the intermediate pressure because the ratio between the first pressure drop $\Delta p1$ and the second pressure drop $\Delta p2$ has changed. Therewith, the corresponding pressure in the control chamber 4, has also decreased, for example to 122 bar.

With the reference pressure controller as used in the pressure controller according to the invention, it is possible to continuously vary the reference pressure over a certain pressure range.

The thermal device 20 comprises a thermal controller for controlling the thermal output of the thermal device 20, so the reference pressure can be controlled actively, which means that it can be changed during the course of an experiment or production run.

Figure 2:
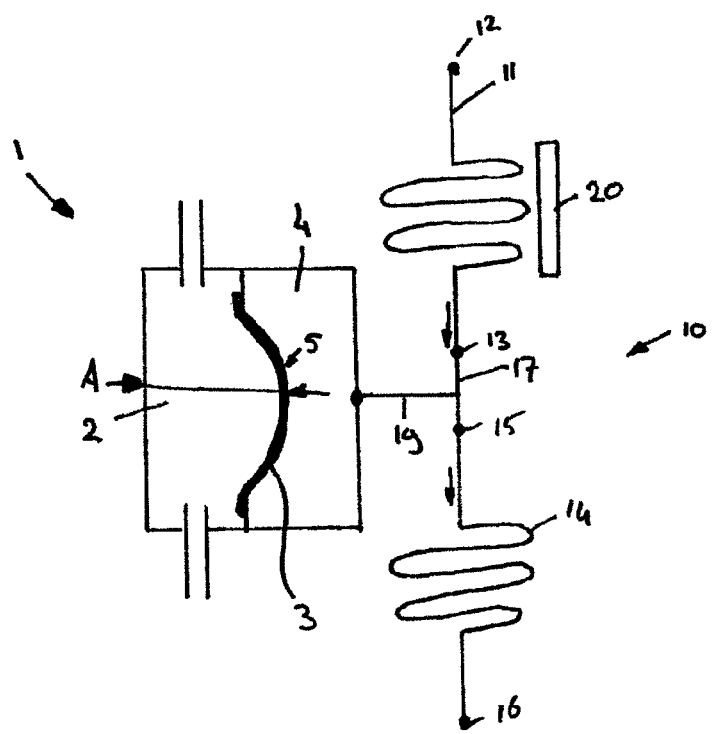
FIG. 2: a second embodiment of a pressure controller according to the invention.

FIG. 2 shows a second embodiment of a pressure controller according to the invention. The embodiment of FIG. 2 works a way that is similar to the embodiment of FIG. 1. The difference between the embodiment of FIG. 1 and the embodiment of FIG. 2 is in the moveable valve member 3 and in the position of the control chamber 4 relative to the flow channel 2. The reference pressure controller is the same in the embodiments of FIG. 1 and FIG. 2. Other embodiments of the reference pressure controller according to the invention can be used instead.

The setup of the moveable valve member 3 and the control chamber 4 of the embodiment of FIG. 2 are that of a regular dome regulator. The flow channel 2 is on one side delimited by a flexible membrane, that separates the flow channel 2 from the control chamber 4. A pressurized pressure control fluid, which can be a gas or a liquid, is present in the control chamber 4. The pressure control gas in the control chamber 4 can move the membrane such that the cross sectional area (indicated by arrows A in FIG. 2) is changed. For example, the pressure control fluid in the reference chamber can push the membrane towards the flow channel 2, and therewith reduce the cross sectional area of the flow channel 2, so the pressure in the flow channel 2 increases.

Where in the embodiment of FIG. 1 the control chamber 4 surrounds a tube-shaped membrane, in the embodiment of FIG. 2, the control chamber 4 is arranged on one side of the flow channel 2.

The pressure control fluid in the control chamber 4 acts on one side of the membrane while the side of the membrane opposite thereof is in contact with the fluid in the flow channel 2. The side of the membrane on which the pressure control fluid acts forms the pressure surface 5 in the embodiment of FIG. 2.

Figure 3:
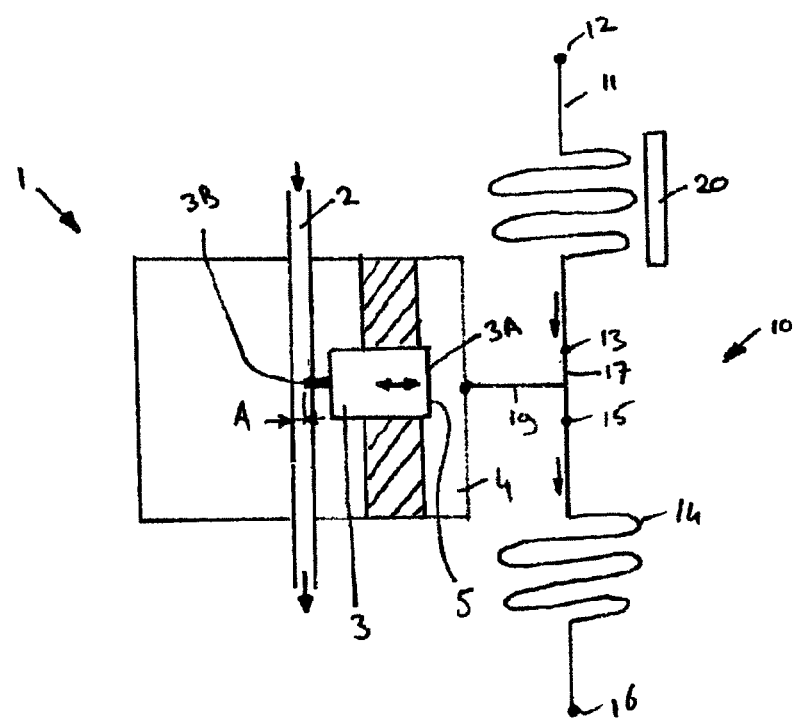
FIG. 3: a third embodiment of a pressure controller according to the invention.

FIG. 3 shows a third embodiment of a pressure controller according to the invention. The embodiment of FIG. 3 works a way that is similar to the embodiments of FIG. 1 and FIG. 2. The difference between the embodiment of FIG. 3 and the embodiments of FIG. 1 and FIG. 2 is in the moveable valve member 3. The reference pressure controller in FIG. 3 is the same as in the embodiments of FIG. 1 and FIG. 2.

In the embodiment of FIG. 3, the moveable valve member 3 is a slide that extends into the flow channel 2. By moving the slide deeper or less deep into the flow channel 2, the cross sectional area of the flow channel (indicated in FIG. 3 by arrows A) changes, and therewith the pressure in the flow channel 2 changes.

In the embodiment of FIG. 3, the slide is actuated by a pressure control fluid in the control chamber 4. The slide has a first surface 3A that is arranged in the control chamber 4 and a second surface 3B on the opposite side of the slide. Second surface 3B extends into flow channel 2. The pressure control fluid acts on first surface 3A (which therewith is the pressure surface 5 in this embodiment) while the pressure in the fluid in the flow channel 2 acts on second surface 3B. Thus, an equilibrium of forces acting on the slide can be established.

If starting from such a state of equilibrium, the pressure of the pressure control fluid in the control chamber 4 is increased, the slide will move such that it moves deeper into the flow channel 2. Therewith, the pressure in flow channel 2 increases as well, allowing a new equilibrium to establish itself.

In the embodiment shown in FIG. 3, surface 3A is larger than surface 3B. This allows to use a reference pressure that is lower than the pressure in the flow channel 2.

In variants of the embodiment of FIG. 3, surface 3A can have the same size as surface 3B or surface 3A can be smaller than surface 3B.

Figure 4:
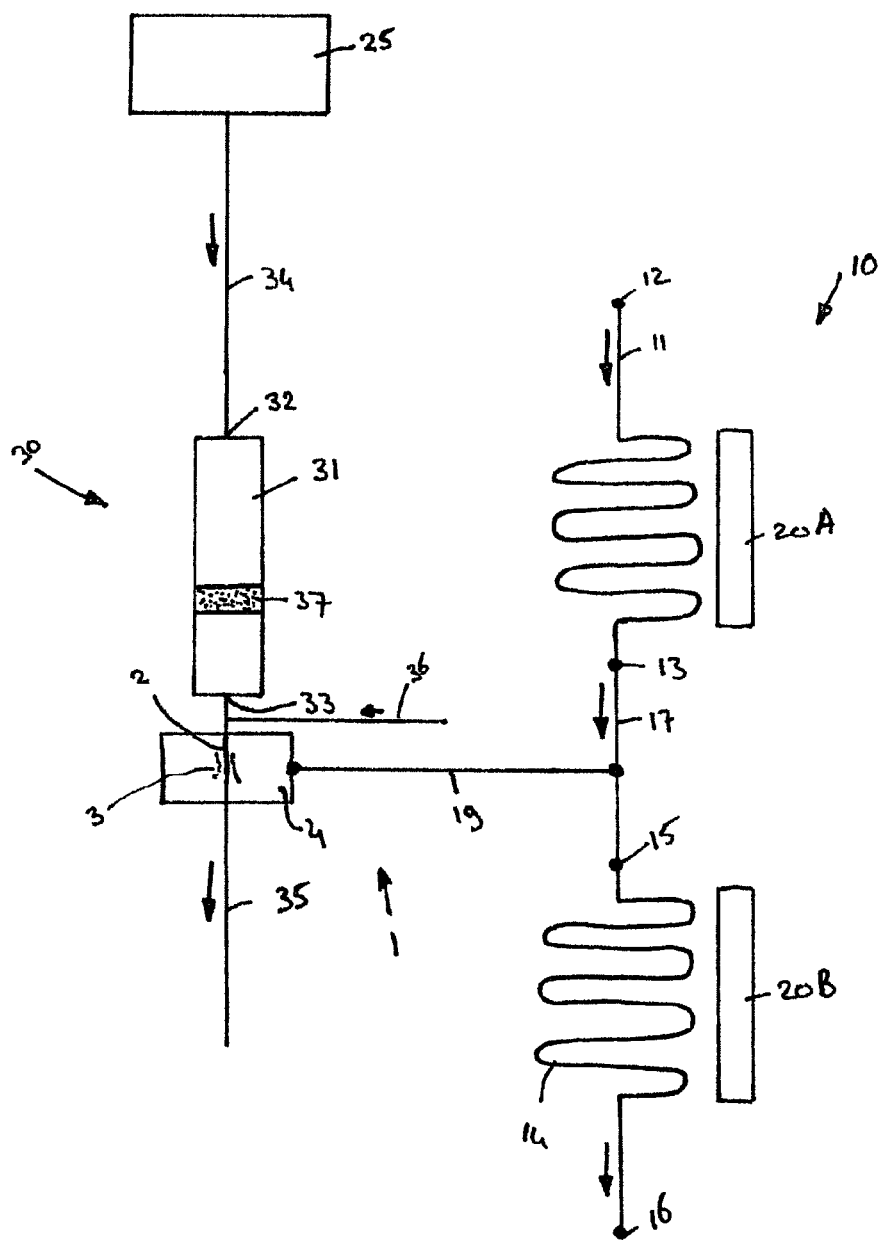
FIG. 4: a first example of a pressure controller according to the invention in combination with a reactor assembly and a primary fluid source.

FIG. 4 shows a first example of a pressure controller 1 according to the invention in combination with a reactor assembly 30 and a primary fluid source 25.

The reactor assembly 30 comprises a flow-through reactor 31 with a reactor inlet 32 and a reactor outlet 33. A reactor feed line 34 extends between the primary fluid source 25 and the reactor inlet 32. The primary fluid source 25 provides a pressurized reaction fluid to the reactor 31, via the reactor feed line 34. The reactor 31 optionally contains a fixed bed 37.

The reactor assembly 30 further comprises a reactor effluent line 35. The reactor effluent line 35 is connected to the reactor outlet 33. Reaction products that are formed in the reactor leave the reactor as reactor effluent via the reactor outlet 33 and are discharged further via the reactor effluent line 35.

Optionally, a diluent line 36 is provided. This diluent line 36 can be used to add a diluent to the reactor effluent. It can alternatively be used for purging. In the embodiment of FIG. 4, the diluent line 36 is connected to the reactor effluent line 35 downstream of the reactor outlet 33 and upstream of the pressure controller 1. However, alternative arrangements are possible, for example, in which the diluent line 36 is connected to the reactor effluent line 35 downstream of the pressure controller 1 or in which the diluent line 36 is connected to the reactor 31, adjacent to the reactor outlet 33 or at least between the fixed bed 37 (if present) and the reactor outlet 33.

In the embodiment of FIG. 4, the flow channel 2 of the pressure controller 1 according to the invention is arranged in the reactor effluent line 35, adjacent to the reactor outlet 33.

The flow channel 2, the moveable member 3 and the control chamber 4 are indicated only schematically in FIG. 4. They can for example be in accordance with any of the embodiments shown in FIGS. 1, 2 and 3.

The reference pressure controller 10 as shown in FIG. 4 is generally the same and works generally the same as the reference pressure controller as described in relation to the embodiment FIG. 1. The only difference is that in the embodiment of FIG. 4, the thermal device 20 comprises a first thermal device part 20A and a second thermal device part 20B. This allows to change the temperature of both the first restrictor channel 11 and the second restrictor channel 14.

Alternatively, a thermal device that heats and/or cools just the first restrictor channel 11 can be used, or a thermal device that heats and/or cools just the second restrictor channel 14.

The advantage of being able to change the temperature of both the first and the second restrictor channel 11,14 is that swift changes in the pressure drop ratio $\Delta\rho 1$ and $\Delta\rho 2$ can be obtained, and therewith swift changes in the reference pressure. This provides a short response time for the pressure control in the reactor assembly 30.

Figure 4A:
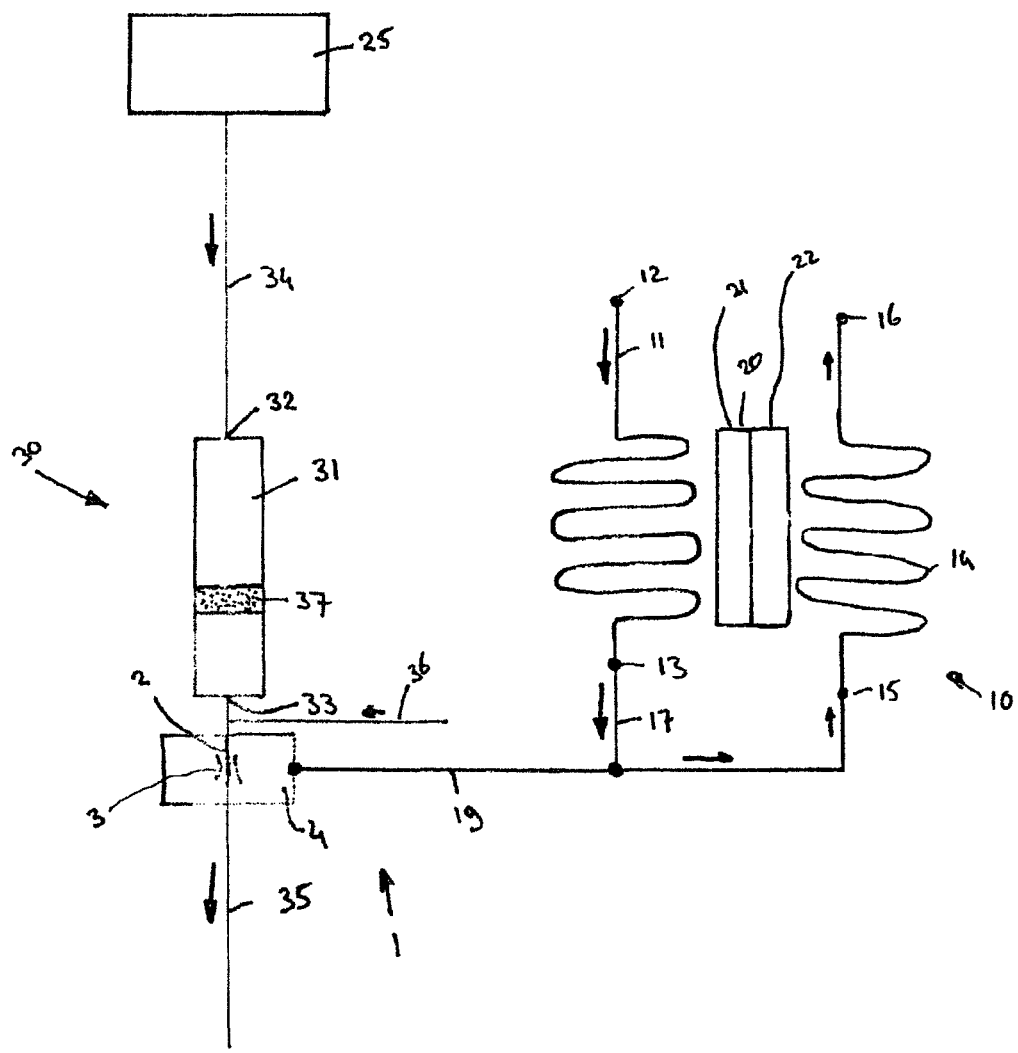
FIG. 4A: a variant of the embodiment of FIG. 4, FIG. 5: a second example of a pressure controller according to the invention in combination with a reactor assembly and a primary fluid source.

FIG. 4A shows a variant of the embodiment of FIG. 4. In the variant of FIG. 4A, the thermal device 20 comprises a Peltier element. The Peltier element has a first side 21 and a second side 22. If the Peltier element is operated such that the first side 21 heats, then automatically the second side 22 cools. If the Peltier element is operated such that the first side 21 cools, then automatically the second side 22 heats.

By arranging the first restrictor channel 11 adjacent to the first side 21 of the Peltier element and the second restrictor channel 14 adjacent to the second side 22 of the Peltier element, a quickly responding pressure controller is obtained.

A system for operating parallel reactors may comprise a plurality of reactor assemblies 30 as shown in FIG. 4 or FIG. 4A, each being connected to its own dedicated pressure controller 1. Also, each reactor assembly 30 may be connected to its own dedicated primary fluid source 25.

Alternatively, a single primary fluid source 25 may be present. In that case, the system further comprises a flow splitter for dividing the fluid flow from the primary fluid source over the reactor assemblies 30. Preferably, the fluid flow is apportioned evenly over the reactor assemblies.

Figure 5:
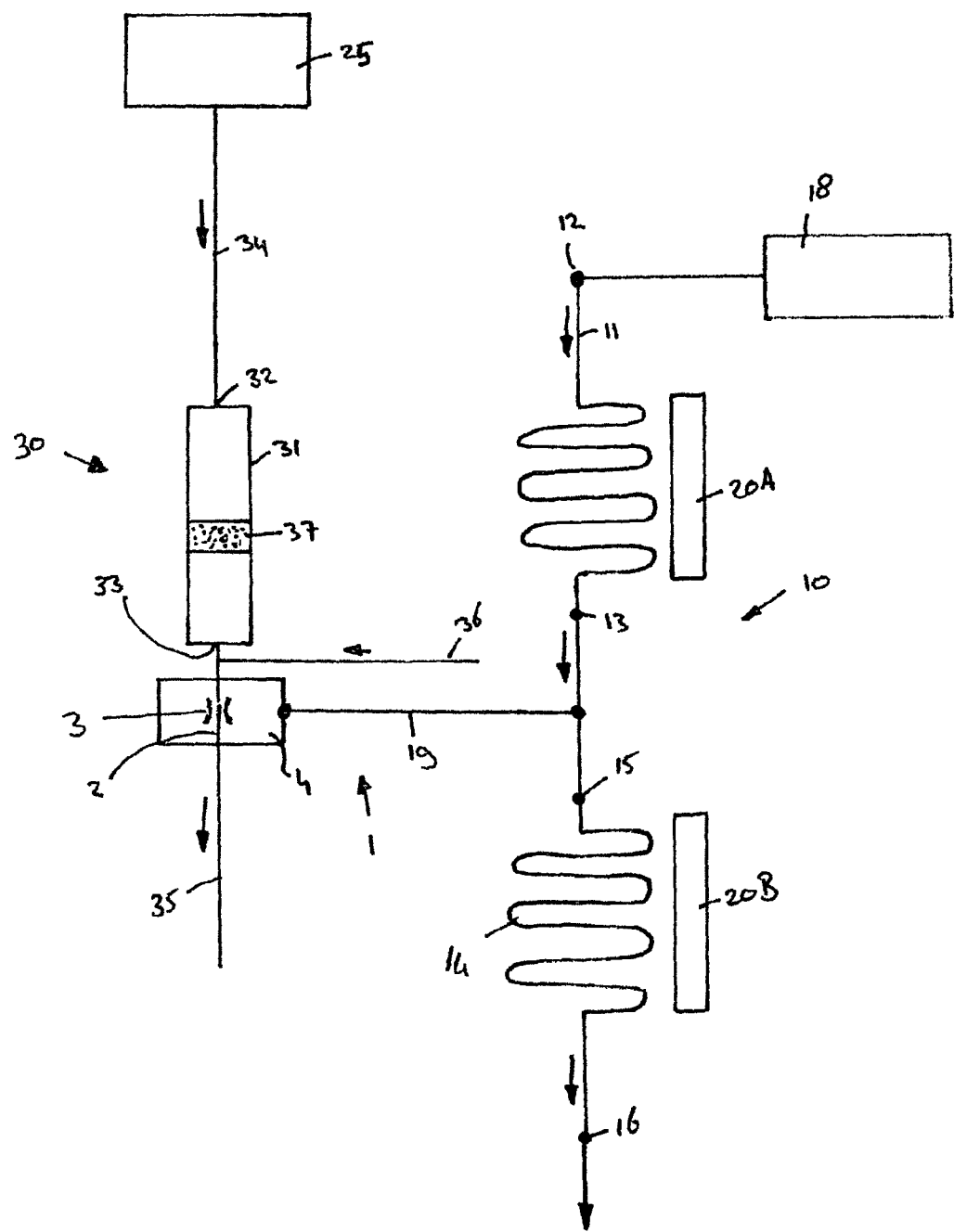

FIG. 5 shows a second example of a pressure controller 1 according to the invention in combination with a reactor assembly 30 and a primary fluid source 25. The setup of the reactor assembly 30 and the pressure controller 1 is generally the same as in the embodiment of FIG. 4. The flow channel 2, the moveable member 3 and the control chamber 4 are indicated only schematically in FIG. 5. They can for example be in accordance with any of the embodiments shown in FIGS. 1, 2 and 3.

The difference with the embodiment of FIG. 4 is that in the embodiment of FIG. 5, the pressure control fluid source comprises a pressure control fluid reservoir 18. This pressure control fluid reservoir 18 is arranged upstream of and in fluid communication with the inlet 12 of the first restrictor channel 11.

The pressure control fluid reservoir 18 is adapted to contain pressurized pressure control fluid. The pressure in the pressure control fluid reservoir 18 is (somewhat) higher than the entrance pressure at the inlet 12 of the first restrictor channel 11, so that a flow of pressure control fluid is established from the pressure control fluid reservoir 18, via the first restrictor channel 11, the fluid passage 13 and the second restrictor channel 14 to the outlet 16 of the second restrictor channel 14. From there, the pressure control fluid may flow to a collection reservoir or it can be transferred to waste. Or it can be transferred back to the pressure control fluid reservoir, for example by a return line and a pump, as is shown in FIG. 6.

A system for operating parallel reactors may comprise a plurality of reactor assemblies 30 as shown in FIG. 5, each being connected to its own dedicated pressure controller 1. Also, each reactor assembly 30 may be connected to its own dedicated primary fluid source 25.

Alternatively, a single primary fluid source 25 may be present. In that case, the system further comprises a flow splitter for dividing the fluid flow from the primary fluid source over the reactor assemblies 30. Preferably, the fluid flow is apportioned evenly over the reactor assemblies.

Figure 6:
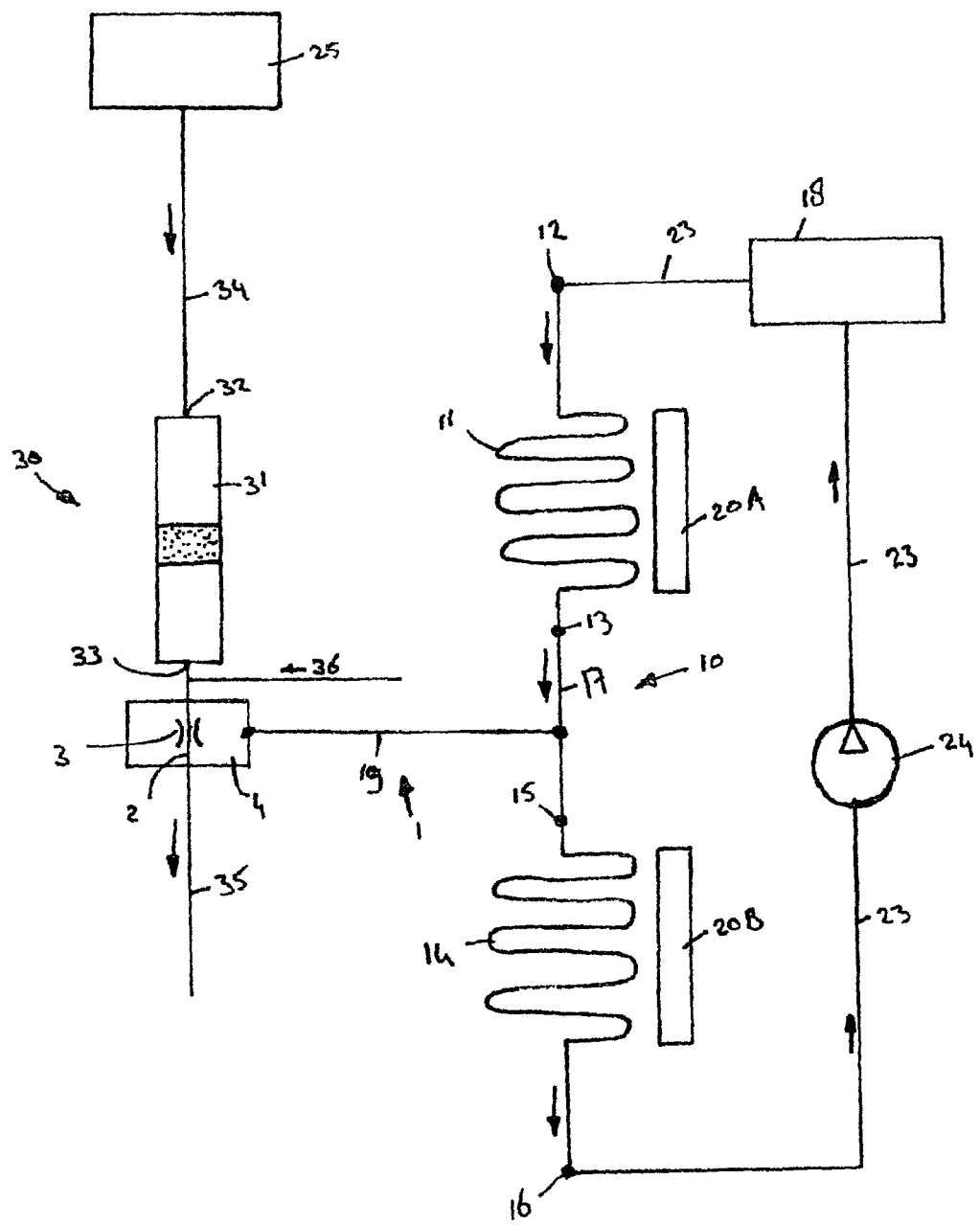
FIG. 6: a third example of a pressure controller according to the invention in combination with a reactor assembly and a primary fluid source.

FIG. 6 shows a third example of a pressure controller 1 according to the invention in combination with a reactor assembly 30 and a primary fluid source 25. The setup of the reactor assembly 30 and the pressure controller 1 is generally the same as in the embodiments of FIG. 4 and FIG. 5. The flow channel 2, the moveable member 3 and the control chamber 4 are indicated only schematically in FIG. 6. They can for example be in accordance with any of the embodiments shown in FIGS. 1, 2 and 3.

The difference with the embodiment of FIG. 5 is that in the embodiment of FIG. 6, a return line 23 is present that extends from the outlet 16 of the second restrictor channel 14 to the inlet 12 of the first restrictor channel 11. Furthermore, a pump 24 is present to provide circulation of the pressure control fluid through the first restrictor 11, the fluid passage 17, the second restrictor 14 and the return line 23. The embodiment of FIG. 6 is in particular suitable for use in combination with a liquid pressure control fluid, although it is possible to use a gaseous pressure control fluid as an alternative.

In the embodiment of FIG. 6, a pressure control fluid reservoir 18 is arranged between the pump 24 and the inlet 12 of the first flow restrictor 11. The presence of such a pressure control fluid reservoir 18 is optional is this embodiment. It however helps to level out any pressure waves in the system that may occur due to the action of the pump 24. In an alternative embodiment (not shown) a pressure control fluid reservoir 18 may be present between the outlet 16 of the second restrictor channel 14 and the pump 24.

A system for operating parallel reactors may comprise a plurality of reactor assemblies 30 as shown in FIG. 6, each being connected to its own dedicated pressure controller 1. Also, each reactor assembly 30 may be connected to its own dedicated primary fluid source 25.

Alternatively, a single primary fluid source 25 may be present. In that case, the system further comprises a flow splitter for dividing the fluid flow from the primary fluid source over the reactor assemblies 30. Preferably, the fluid flow is apportioned evenly over the reactor assemblies.

Figure 7:
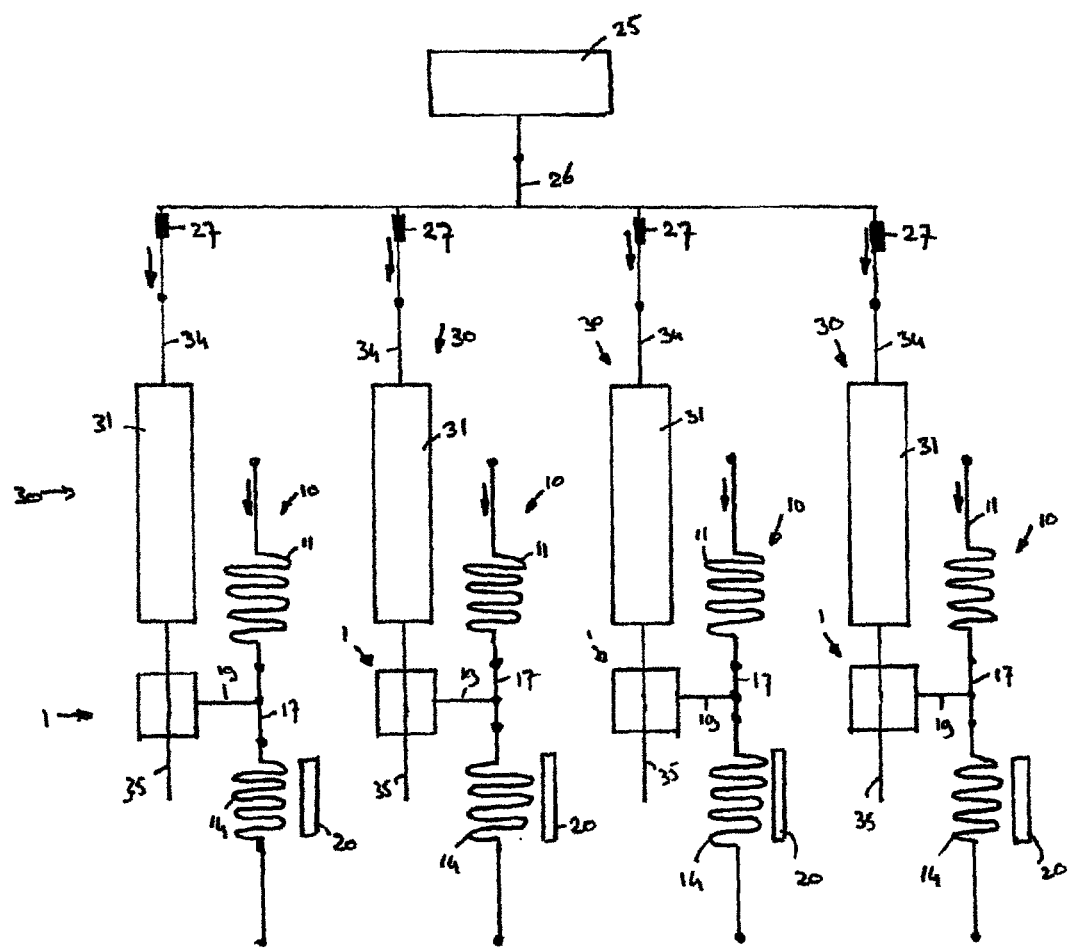
FIG. 7: a first example of pressure controllers according to the invention used in a system with a plurality reactor assemblies.

FIG. 7 shows a first example of pressure controllers 1 according to the invention used in a system with a plurality reactor assemblies 30.

In the embodiment of the system shown in FIG. 7, a single primary fluid source 25 is be present. Furthermore, the system comprises a flow splitter 26 for dividing the fluid flow from the primary fluid source over the reactor assemblies 30. The flow splitter comprises a plurality of flow restrictors 27. The flow restrictors 27 all have at least substantially the same resistance to fluid flow, so that the fluid flow is apportioned evenly over the reactor assemblies. The flow restrictors preferably are passive flow restrictors, which means that they have a fixed resistance to fluid flow.

The pressure controllers used in the system as shown in FIG. 7 can be any of the pressure controllers in accordance with the embodiments described in relation to the FIGS. 1, 2, 3, 4, 4A, 5 and 6. The reactor assemblies 30 used in the system as shown in FIG. 7 can be any of the reactor assemblies in accordance with the embodiments described in relation to the FIGS. 4, 4A, 5 and 6.

FIG. 7 shows the variant of the pressure controllers 1 according to the invention in which only the second restrictor channel 14 is heated and/or cooled. Alternatively, it is possible to use pressure controllers 1 according to the invention in which only the first restrictor channel 11 is heated and/or cooled, or pressure controllers 1 according to the invention in which both the first restrictor channel 11 and the second restrictor channel 14 are heated and/or cooled.

In the system of FIG. 7, multiple pressure controllers 1 according to the invention are present in the system. They can all be provided with their own individual pressure control fluid source. Alternatively, a common pressure control fluid source can present, and a flow splitter that distributes pressure control fluid from the single pressure control fluid source to the reference pressure controllers of multiple pressure controllers according to the invention. The common pressure control fluid source can provide pressure control fluid to all reference pressure controllers or to a group of reference pressure controllers.

Furthermore, a pressure control fluid collection device can be present, that receives used pressure control fluid from a plurality of reference pressure controllers. The pressure control fluid collection device can receive pressure control fluid from all reference pressure controllers or from a group of reference pressure controllers.

Figure 8:
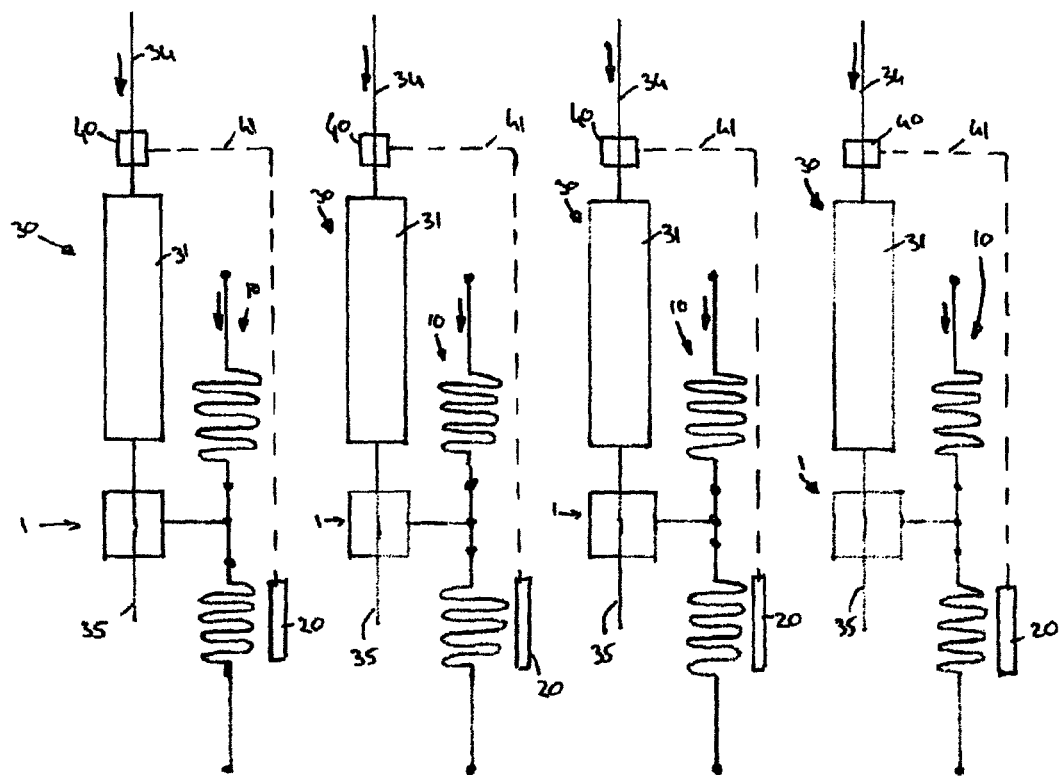
FIG. 8: a second example of pressure controllers according to the invention used in a system with a plurality reactor assemblies.

FIG. 8 shows a second example of pressure controllers 1 according to the invention used in a system with a plurality reactor assemblies 30.

The pressure controllers used in the system as shown in FIG. 8 can be any of the pressure controllers in accordance with the embodiments described in relation to the FIGS. 1, 2, 3, 4, 4A, 5, 6 and 7. The reactor assemblies 30 used in the system as shown in FIG. 8 can be any of the reactor assemblies in accordance with the embodiments described in relation to the FIGS. 4, 4A, 5 and 6.

In the embodiment of FIG. 8, a pressure sensor 40 is present in each reactor feed line 34. The pressure sensors 40 measure the pressure in the reactor feed lines 34, adjacent to the reactor inlets 33.

The pressure sensors 40 provide information about the actual pressure occurring at or adjacent to the reactor inlets. This information, generally in the form of a measurement signal, can be used to control the thermal devices 20 of the pressure controllers 1 according to the invention that are present in the system. In FIG. 8, this is indicated by the dotted line 41.

In the embodiment of FIG. 8, the measurement information from a pressure sensor 40 is used to control the pressure adjacent to the reactor outlet of the same reactor assembly in which the pressure sensor is arranged.

In the embodiment of the system of fig. each reactor assembly 30 may be connected to its own dedicated primary fluid source 25.

Alternatively, a single primary fluid source 25 may be present, for example like is shown in FIG. 7. In that case, the system further comprises a flow splitter for dividing the fluid flow from the primary fluid source over the reactor assemblies 30. The fluid flow is apportioned evenly over the reactor assemblies 30 due to the presence of the flow restrictors 27 (see FIG. 7) that all have at least substantially the same resistance to fluid flow.

In such an embodiment, the pressure sensors 40 and their connection to the thermal units 20 as indicated in FIG. 8, may be used to obtain the same pressure at each reactor inlet. That way, the fluid flow from the primary fluid source is apportioned evenly over the reactor assemblies 30 in a very accurate manner.

In the system of FIG. 8, multiple pressure controllers 1 according to the invention are present in the system. They can all be provided with their own individual pressure control fluid source. Alternatively, a common pressure control fluid source can present, and a flow splitter that distributes pressure control fluid from the single pressure control fluid source to the reference pressure controllers of multiple pressure controllers according to the invention. The common pressure control fluid source can provide pressure control fluid to all reference pressure controllers or to a group of reference pressure controllers.

Furthermore, a pressure control fluid collection device can be present, that receives used pressure control fluid from a plurality of reference pressure controllers. The pressure control fluid collection device can receive pressure control fluid from all reference pressure controllers or from a group of reference pressure controllers.

Figure 9:
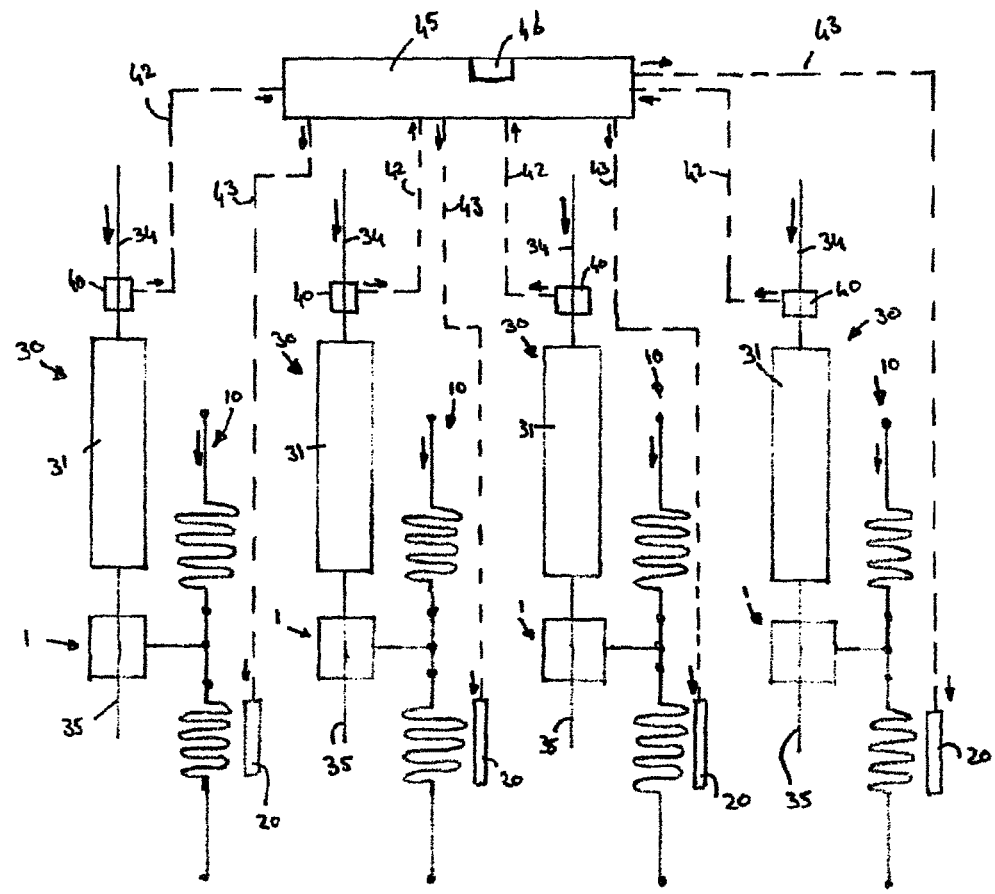
FIG. 9: a third example of pressure controllers according to the invention used in a system with a plurality reactor assemblies.

FIG. 9 shows a third example of pressure controllers 1 according to the invention used in a system with a plurality reactor assemblies 30.

The pressure controllers used in the system as shown in FIG. 9 can be any of the pressure controllers in accordance with the embodiments described in relation to the FIGS. 1, 2, 3, 4, 4A, 5, 6, 7 and 8. The reactor assemblies 30 used in the system as shown in FIG. 9 can be any of the reactor assemblies in accordance with the embodiments described in relation to the FIGS. 4, 4A, 5 and 6.

Although not shown in FIG. 9 for reasons of clarity, in the embodiment of FIG. 9 a single primary fluid source 25 is present, like is shown in FIG. 7. The system of FIG. 9 further comprises a flow splitter for dividing the fluid flow from the primary fluid source over the reactor assemblies 30. The fluid flow is apportioned evenly over the reactor assemblies 30 due to the presence of the flow restrictors 27 (see FIG. 7) that all have at least substantially the same resistance to fluid flow.

In the embodiment of FIG. 9, like in FIG. 7, the flow splitter is arranged downstream of the primary fluid source and upstream of the reactor assemblies. The flow splitter has an inlet and multiple passive flow restrictors. The inlet of the flow splitter is connected to the primary fluid source and each passive flow restrictor is in fluid communication with said inlet. Each passive flow restrictor has an outlet, which outlet is connected to the first end of the reactor feed line of its own dedicated reactor assembly. All passive flow restrictors have an at least substantially equal resistance to fluid flow.

As can be seen in FIG. 9, each reactor assembly 30 is provided with a pressure controller 1 according to the invention. The pressure controller 1 is arranged to control the pressure in the reactor effluent line 35 of a certain reactor assembly 30, adjacent to the reactor outlet 33 of a reactor 31 of that reactor assembly.

In the system of FIG. 9, each reactor feed line 34 is provided with a pressure sensor 40, which pressure sensor 40 is arranged to measure the pressure in said reactor feed line 34, adjacent to the reactor inlet 33 of a reactor 31 in a reactor assembly 30.

In this embodiment, further a pressure control arrangement 45 is provided. This pressure control arrangement 45 is linked to the pressure sensors 40 and the pressure controllers 1. The pressure control arrangement 45 receives measurement signals for all pressure sensors 40, as is indicated by dashed lines 42. The pressure control arrangement uses these measurement signals to control the thermal devices 20 of the pressure controllers 1, in order to control the pressure adjacent the reactor outlets 33, and optionally therewith in a indirect way the pressure at the reactor inlets 33.

The pressure control arrangement 45 preferably comprises an input device 46 allowing to input at least a feed line pressure setpoint into the pressure control arrangement 45. The feed line pressure setpoint represents a desired feed line pressure. Advantageously, the desired feed line pressure is the same for all reactor assemblies.

In the embodiment of FIG. 9, the pressure control arrangement 45 is adapted and/or programmed to individually control the pressure controllers 1. Optionally it is adapted and/or programmed such that for each reactor assembly 30 the pressure measured by the corresponding pressure sensor 40 is compared to the feed line pressure setpoint. In case of a difference between the measured feed line pressure and the feed line pressure setpoint, the corresponding pressure controller 1 is adjusted such that the feed line pressures of the reactor assemblies 30 are the same during an experiment.

In the system of FIG. 9, multiple pressure controllers 1 according to the invention are present in the system. They can all be provided with their own individual pressure control fluid source. Alternatively, a common pressure control fluid source can present, and a flow splitter that distributes pressure control fluid from the single pressure control fluid source to the reference pressure controllers of multiple pressure controllers according to the invention. The common pressure control fluid source can provide pressure control fluid to all reference pressure controllers or to a group of reference pressure controllers.

Furthermore, a pressure control fluid collection device can be present, that receives used pressure control fluid from a plurality of reference pressure controllers. The pressure control fluid collection device can receive pressure control fluid from all reference pressure controllers or from a group of reference pressure controllers.

Figure 10:
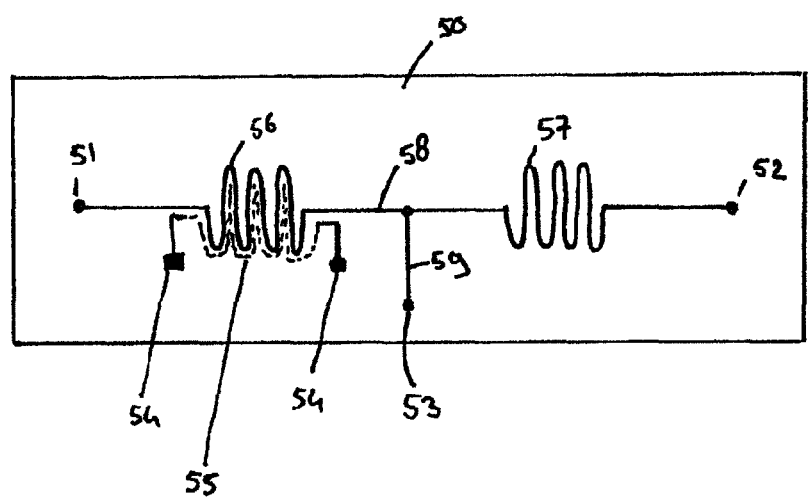
FIG. 10: a first example of a microfluidic chip that can be used in the invention.

FIG. 10 shows a first example of a microfluidic chip 50 that can be used in the invention, in schematic way.

The microfluidic chip 50 contains a primary restrictor channel 56 and a secondary restrictor channel 57. These restrictor channels 56, 57 are schematically indicated in FIG. 10, they can have any suitable shape (e.g. similar to the shape in the drawing, or a spiral, etc.). The primary restrictor channel 56 and the secondary restrictor channel 57 are in fluid communication with each other via channel 58.

The microfluidic chip 50 comprises three connection ports 51, 52 and 53. Connection port 51 is located at the free end of the primary restrictor channel 56, connection port 52 is located at the free end of the secondary restrictor channel 57, and connection port 53 is located at channel 58 or at the free end of a branch 59 thereof.

The microfluidic chip is provided with heat tracing 55 with connectors 54 for applying a voltage to the heat tracing 55. The heat tracing 55 is in this example arranged in the vicinity of the primary restrictor channel 56. The heat tracing is for example made by the deposit of a metal wire-like layer on the chip. The shape of the tracing may follow the shape of the primary restrictor channel 56 as shown in FIG. 10, but alternatively it can have a different shape.

A microfluidic chip 50 as shown in FIG. 10 can be used in the invention, in particular in the reference pressure controller.

In that case, the primary restrictor channel 56 can be used as a first restrictor channel 11, the secondary restrictor channel 57 can be used as the second restrictor channel 14, connection port 51 as the inlet 12 of the first restrictor channel 11, channel 58 as the fluid passage, the branch 59 and connection port 53 as the connector 19 to the control chamber 4 and the connection port 52 as the outlet 16 of the second restrictor channel 14. The heat tracing can be used in the thermal device 20.

Alternatively, the primary restrictor channel 56 can be used as a second restrictor channel 14, the secondary restrictor channel 57 can be used as the first restrictor channel 11, connection port 51 as the outlet 16 of the second restrictor channel 14, channel 58 as the fluid passage, the branch 59 and connection port 53 as the connector 19 to the control chamber 4 and the connection port 52 as the inlet 12 of the first restrictor channel 11. The heat tracing can be used in the thermal device 20.

Figure 11:
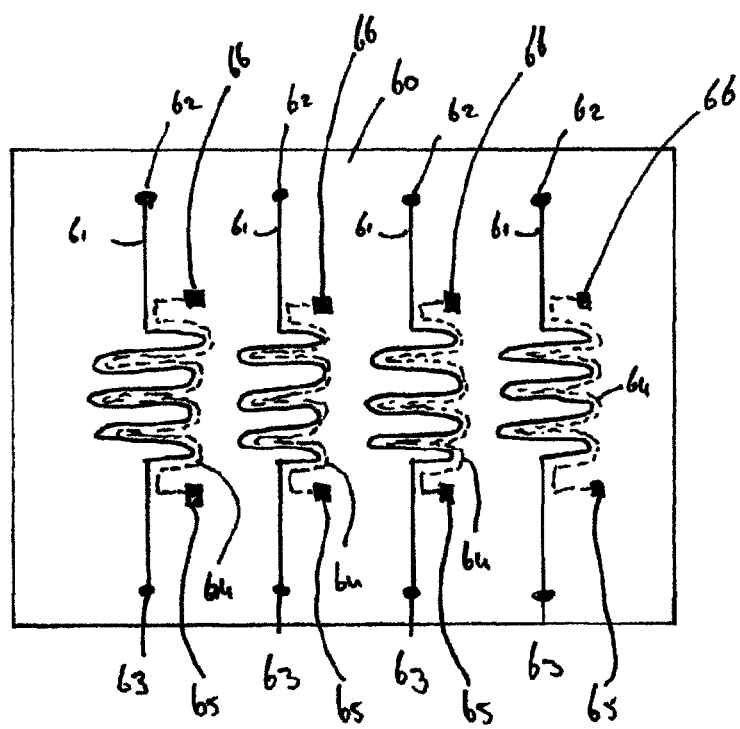
FIG. 11: a second example of a microfluidic chip that can be used in the invention.

FIG. 11 shows a second example of a microfluidic chip 60 that can be used in the invention.

The microfluidic chip 60 comprises multiple restrictor channels 61. In FIG. 11, four restrictor channels 61 are shown, but any number is possible.

Each restrictor channel 61 has an first connection port 61 and a second connection port 62. Optionally, each restrictor channel is provided with heat tracing 64, having connectors 65.

The restrictor channels 61 in microfluidic chip 60 as shown in FIG. 11 may be used as first restrictor channels 11 or second restrictor channels 14 in pressure controllers according to the invention. This is in particular useful when using multiple pressure controllers according to the invention in a system with multiple reactor assemblies.

Figure 12:
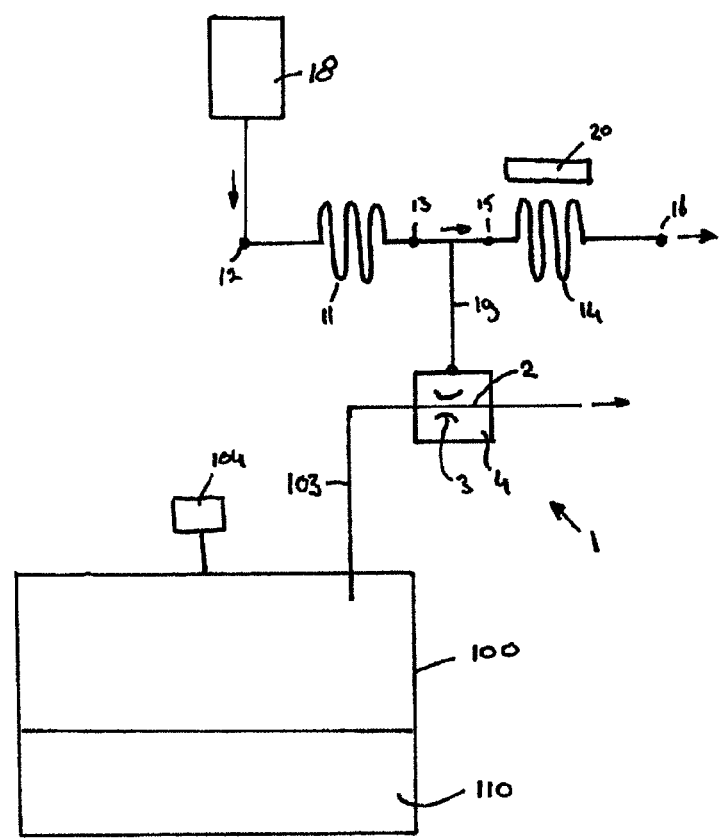
FIG. 12: an example of a pressure controller according to the invention used in an alternative system.

FIG. 12 shows an example of a pressure controller according to the invention used in an alternative system.

The system as shown in FIG. 12 comprises at least one batch reactor 100. FIG. 12 shows just one batch reactor 100, but alternatively there could be more batch reactors present, preferably arranged in parallel.

When used, the batch reactor 100 comprises a mixture 110 of reactants. Alternatively, the batch reactor contains a mixture of one or more reactants and one or more catalysts.

The system of FIG. 12 further comprises a flow line 103. This flow line can be used to control the pressure in the batch reactor 100. For example, if the pressure in the batch reactor 100 drops, e.g. because a gaseous reactant is consumed in the reaction, gas can be fed into the reactor via flow line 103. The gas fed into the batch reactor can for example be more of the gaseous reactant or an inert gas such as nitrogen gas.

On the other hand, if the pressure in the batch reactor 100 rises due the that in the reaction that takes place in the batch reactor, a gas is produced or due to a rise in temperature, flow line 103 can be used to release some gas from the batch reactor.

The flow line 103 is provided with a pressure controller 1 according to the invention. In the example of FIG. 12, the pressure controller 1 is of the type as shown in FIG. 5, in the variant in which the controllable thermal device 20 is adapted to heat and/or cool the second restrictor channel 14. However, any of the other embodiments of the pressure controller 1 according to the invention may be applied here instead.

The pressure controller 1 controls the discharge of gas though the flow line 103 and therewith the pressure in the batch reactor 100.

Preferably, the system according to FIG. 12 comprises a pressure sensor 104, that is adapted to measure the pressure in the batch reactor. By measuring the pressure in the batch reactor, a pressure measurement value for the pressure in the batch reactor is obtained. This obtained measurement value can then be compared with a set value for the desired pressure. In case the measured pressure deviates from the desired pressure, the reference pressure in the control chamber of the pressure controller can be changed by activating the thermal device of the pressure controller. Therewith the temperature of the pressure control fluid in the first restrictor channel and/or the second restrictor channel can be changed such that the pressure drop ratio $\Delta p1:\Delta p2$ changes. This results in a change of the intermediate pressure in the connector 19 of the pressure controller, and therewith in a change of pressure in the control chamber 4 of the pressure controller.

The invention claimed is:

1. A pressure controller for use in operating parallel reactors,
said pressure controller being adapted to control the pressure in a fluid flow,
said pressure controller comprising:
a flow channel for the fluid flow of which the pressure is to be controlled, said flow channel having a cross sectional area,
a movable valve member, said moveable valve member being adapted to control the size of the cross sectional area of the flow channel in order to control the pressure of the fluid flow in the flow channel,
a valve actuator, said valve actuator being adapted to control a position of the valve member,
said valve actuator comprising a control chamber having a fluid under a reference pressure therein, said fluid engaging a pressure surface of the valve member for exerting a control force thereon,
a reference pressure controller, said reference pressure controller being adapted to control the reference pressure in said control chamber,
said reference pressure controller comprising:
a first restrictor channel, said first restrictor channel having an inlet and an outlet,
a second restrictor channel, said second restrictor channel having an inlet and an outlet,
a fluid passage, which fluid passage extends between the outlet of the first restrictor channel and the inlet of the second restrictor channel, said fluid passage allowing fluid communication between the first restrictor channel and the second restrictor channel,
a pressure control fluid source, said pressure control fluid source being adapted to provide a flow of pressure control fluid through the first restrictor channel, the fluid passage and the second restrictor channel,
said flow of pressure control fluid having an entrance pressure at the inlet of the first restrictor channel and an exit pressure at the outlet of the second restrictor channel, said entrance pressure being higher than said exit pressure, said flow of pressure control fluid experiencing a first pressure drop $\Delta p1$ over the first restrictor channel and a second pressure drop $\Delta p2$ over the second restrictor channel, a connector connecting the fluid passage to the control chamber of the valve actuator, said connector being in fluid communication with said control chamber, the pressure control fluid at the connector having an intermediate pressure which is lower than the entrance pressure but higher than the exit pressure, said intermediate pressure being determined by a ratio between the first pressure drop $\Delta p1$ and the second pressure drop $\Delta p2$, and a controllable thermal device, said thermal device being adapted to heat and/or cool the first restrictor channel and/or the second restrictor channel, therewith influencing the ratio between the first pressure drop $\Delta p1$ and the second pressure drop $\Delta p2$, said thermal device comprising a thermal controller for controlling a thermal output of the thermal device.

2. The pressure controller according to claim 1,
wherein the first restrictor channel and/or the second restrictor channel is a channel in a microfluidic chip.

3. The pressure controller according to claim 1,
wherein the first restrictor channel and/or the second restrictor channel is a channel in a capillary tube.

4. The pressure controller according to claim 1,
wherein the pressure control fluid source comprises a pressure control fluid reservoir, said pressure control fluid reservoir being arranged upstream of and in fluid communication with the inlet of the first restrictor channel, said pressure control fluid reservoir being adapted to contain pressurized pressure control fluid.

5. The pressure controller according to claim 4,
wherein the pressure control fluid source of the pressure controller comprises a return line and a pump, said return line extending between the outlet of the second restrictor channel and the inlet of the first restrictor channel or between the outlet of the second restrictor channel and the pressure control fluid reservoir of claim 4, said pump being arranged in said return line.

6. The pressure controller according to claim 1,
wherein the pressure controller comprises an entrance pressure control device for controlling the entrance pressure or an exit pressure control device for controlling the exit pressure.

7. The pressure controller according to claim 1,
wherein the thermal device comprises a Peltier element and/or electric heat tracing and/or a pair of electrodes that are provided with an electrical voltage and/or a system for circulating a thermal fluid for heating and/or cooling a restrictor channel.

8. The pressure controller according to claim 7,
wherein the Peltier element has a first side and a second side, which first side cools when the second side heats and which first side heats when the second side cools, wherein first side is arranged to heat and/or cool the first restrictor channel and the second side is arranged to heat and/or cool the second restrictor channel.

9. The pressure controller according to claim 1,
wherein the thermal device comprises a housing, said housing having an interior, a temperature of said interior being controllable, said housing accommodating the first restrictor channel or the second restrictor channel.

10. The pressure controller according to claim 1,
wherein the moveable valve member comprises a membrane, said membrane being a part of a wall of the flow channel.

11. The pressure controller according to claim 1,
wherein the moveable valve member comprises a slide that optionally extends into the flow channel.

12. A system for operating parallel reactors,
said system comprising
a primary fluid source, which primary fluid source is adapted to provide a reaction fluid under pressure,
a plurality of reactor assemblies, each reactor assembly comprising:
a flow-through reactor, said flow-through reactor comprising a reactor inlet and a reactor outlet,
a reactor feed line for feeding reaction fluid to the flow-through reactor, which reactor feed line has a first end and a second end, said first end being in fluid communication with the primary fluid source and said second end being connected to the reactor inlet of the flow-through reactor,
a reactor effluent line for discharging reactor effluent from the reactor, which reactor effluent line has a first end, which first end is connected to the reactor outlet of the flow-through reactor, and
a pressure controller according to claim 1, being arranged to control the pressure in a reactor of a reactor assembly or in the system upstream or downstream of said reactor of said reactor assembly.

13. The system according to claim 12,
wherein the pressure controller is connected to or arranged in a reactor feed line or a reactor effluent line.

14. The system according to claim 12,
wherein each reactor feed line or each reactor effluent line is provided with a pressure controller according to claim 1.

15. The system according to claim 12,
wherein a plurality of said pressure controllers is present, and
wherein the first restrictor channels of these pressure controllers are present in a single, first microfluidic chip and the second restrictor channels of these pressure controllers are present in a single, second microfluidic chip.

16. The system according to claim 12,
wherein the system further comprises a pressure sensor, said pressure sensor being adapted to measure the pressure in a reactor of a reactor assembly or upstream or downstream of a reactor in a reactor assembly, said pressure sensor being adapted to provide a pressure measurement signal, and
wherein the thermal device is adapted to heat and/or cool a first restrictor channel and/or a second restrictor channel on the basis of said pressure measurement signal.

17. The system according to claim 16,
wherein the pressure sensor is arranged to measure the pressure in the reactor feed line, optionally at or adjacent to the reactor inlet of a reactor in a reactor assembly, and
wherein the pressure controller is arranged to control the pressure in the reactor effluent line, optionally at or adjacent to the reactor outlet of said reactor of said reactor assembly.

18. The system according to claim 17,
wherein the system further comprises a flow splitter, which is arranged downstream of the primary fluid source and upstream of the reactor assemblies,
said flow splitter having an inlet and multiple passive flow restrictors, wherein the inlet of the flow splitter is connected to the primary fluid source and each passive flow restrictor is in fluid communication with said inlet, and
wherein each passive flow restrictor has an outlet, which outlet is connected to the first end of the reactor feed line of its own dedicated reactor assembly, and
wherein all passive flow restrictors have an at least substantially equal resistance to fluid flow.

19. The system according to claim 18,
wherein each reactor assembly is provided with said pressure controller, said pressure controller being arranged to control the pressure in the reactor effluent line, optionally at or adjacent to the reactor outlet of said reactor of said reactor assembly, and
wherein each reactor feed line is provided with a pressure sensor, which pressure sensor is arranged to measure the pressure in said reactor feed line, optionally at or adjacent to the reactor inlet of a reactor in a reactor assembly,
in which system further a pressure control arrangement is provided,
said pressure control arrangement being linked to the pressure sensors and the pressure controllers,
said pressure control arrangement comprising an input device allowing to input at least a feed line pressure setpoint into the pressure control arrangement, said feed line pressure setpoint representing a desired feed line pressure, said desired feed line pressure being the same for all reactor assemblies, and
wherein said pressure control arrangement is adapted and/or programmed to individually control the pressure controllers such that for each reactor assembly the pressure measured by the corresponding pressure sensor is compared to said feed line pressure setpoint and in case of a difference between the measured feed line pressure and the feed line pressure setpoint, the corresponding pressure controller being adjusted such that the feed line pressures are the same during an experiment.

20. A method for operating parallel reactors,
said method comprising the following steps:
providing a system for operating parallel reactors according to claim 12,
providing a fluid flow from the primary fluid source through the reactor feed lines, the reactors and the reactor effluent lines,
making a pressure control fluid flow through the first restrictor channel, the fluid passage and the second restrictor channel of said pressure controller, and therewith making a first pressure drop $\Delta p1$ occur over the first restrictor channel and a second pressure drop $\Delta p2$ occur over the second restrictor channel,
measuring the pressure in a reactor feed line or a reactor effluent line of a reactor assembly, therewith obtaining a pressure measurement value,
comparing said obtained measurement value with a set value for a desired pressure,
in case the measured pressure deviates from the desired pressure, changing the reference pressure in the control chamber of the valve actuator by:
activating the thermal device of the pressure controller, therewith changing the temperature of the pressure control fluid in the first restrictor channel and/or the second restrictor channel such that the pressure drop ratio $\Delta p1:\Delta p2$ changes.

21. The method according to claim 20,
wherein the pressure is measured at or adjacent to the reactor inlet of a reactor in a reactor assembly, and wherein the pressure controller is arranged in said reactor assembly at or adjacent to the reactor outlet of said reactor of said reactor assembly.

22. A system for operating a batch reactor,
wherein said system comprises:
at least one batch reactor, said batch reactor being adapted to accommodate one or more reactants, optionally in combination with one or more catalysts,
a flow line, adapted for controlled discharge of blanket gas and/or reactor effluent from the batch reactor,
which flow line is provided with a pressure controller,
said pressure controller being adapted to control the pressure in a fluid flow,
said pressure controller comprising:
a flow channel for the fluid flow of which the pressure is to be controlled, said flow channel having a cross sectional area,
a movable valve member, said moveable valve member being adapted to control the size of the cross sectional area of the flow channel in order to control the pressure of the fluid flow in the flow channel,
a valve actuator, said valve actuator being adapted to control a position of the valve member,
said valve actuator comprising a control chamber having a fluid under a reference pressure therein, said fluid engaging a pressure surface of the valve member for exerting a control force thereon,
a reference pressure controller, said reference pressure controller being adapted to control the reference pressure in said control chamber,
said reference pressure controller comprising:
a first restrictor channel, said first restrictor channel having an inlet and an outlet,
a second restrictor channel, said second restrictor channel having an inlet and an outlet,
a fluid passage, which fluid passage extends between the outlet of the first restrictor channel and the inlet of the second restrictor channel, said fluid passage allowing fluid communication between the first restrictor channel and the second restrictor channel,
a pressure control fluid source, said pressure control fluid source being adapted to provide a flow of pressure control fluid through the first restrictor channel, the fluid passage and the second restrictor channel,
said flow of pressure control fluid having an entrance pressure at the inlet of the first restrictor channel and an exit pressure at the outlet of the second restrictor channel, said entrance pressure being higher than said exit pressure,
said flow of pressure control fluid experiencing a first pressure drop $\Delta p1$ over the first restrictor channel and a second pressure drop $\Delta p2$ over the second restrictor channel,
a connector connecting the fluid passage to the control chamber of the valve actuator, said connector being in fluid communication with said control chamber, the pressure control fluid at the connector having an intermediate pressure which is lower than the entrance pressure but higher than the exit pressure, said intermediate pressure being determined by a ratio between the first pressure drop $\Delta p1$ and the second pressure drop $\Delta p2$, and a controllable thermal device, said thermal device being adapted to heat and/or cool the first restrictor channel and/or the second restrictor channel, therewith influencing the ratio between the first pressure drop $\Delta p1$ and the second pressure drop $\Delta p2$, said thermal device comprising a thermal controller for controlling a thermal output of the thermal device.

23. A method for operating at least one batch reactor, said method comprising the following steps:

providing a system for operating a batch reactor according to claim 22, providing a fluid flow through the flow line, adapted for controlled discharge of blanket gas and/or reactor effluent from the batch reactor, making a pressure control fluid flow through the first restrictor channel, the fluid passage and the second restrictor channel of said pressure controller, and therewith making a first pressure drop $\Delta p1$ occur over the first restrictor channel and a second pressure drop $\Delta p2$ occur over the second restrictor channel, measuring the pressure in the batch reactor, therewith obtaining a pressure measurement value, comparing said obtained measurement value with a set value for a desired pressure, in case the measured pressure deviates from the desired pressure, changing the reference pressure in the control chamber of the valve actuator by:

activating the thermal device of the pressure controller, therewith changing the temperature of the pressure control fluid in the first restrictor channel and/or the second restrictor channel such that the pressure drop ratio $\Delta p1:\Delta p2$ changes.

* * * * *